United States Patent
Jackson et al.

(10) Patent No.: US 10,026,108 B2
(45) Date of Patent: Jul. 17, 2018

(54) SYSTEMS, DEVICES, AND METHODS FOR SHARING CONTENT

(71) Applicant: RAKUTEN COMMERCE LLC, Aliso Viejo, CA (US)

(72) Inventors: John Clarke Jackson, Laurel, MD (US); Brian Eugene Cunningham, Laurel, MD (US); Travis Ames Hurant, Washington, DC (US)

(73) Assignee: Rakuten Commerce LLC, San Mateo, CA (US)

( * ) Notice: Subject to any disclaimer, the term of this patent is extended or adjusted under 35 U.S.C. 154(b) by 476 days.

(21) Appl. No.: 14/874,177

(22) Filed: Oct. 2, 2015

(65) Prior Publication Data

US 2016/0027076 A1   Jan. 28, 2016

Related U.S. Application Data

(63) Continuation of application No. 12/344,290, filed on Dec. 26, 2008.

(60) Provisional application No. 61/016,627, filed on Dec. 26, 2007.

(51) Int. Cl.
| | |
|---|---|
| *G06F 15/16* | (2006.01) |
| *G06Q 30/06* | (2012.01) |
| *H04L 29/08* | (2006.01) |
| *G06F 17/30* | (2006.01) |
| *H04L 29/06* | (2006.01) |

(52) U.S. Cl.
CPC ... *G06Q 30/0601* (2013.01); *G06F 17/30887* (2013.01); *H04L 65/403* (2013.01); *H04L 67/02* (2013.01); *H04L 67/10* (2013.01); *H04L 67/1095* (2013.01); *H04L 67/141* (2013.01); *H04L 67/36* (2013.01)

(58) Field of Classification Search
None
See application file for complete search history.

(56) References Cited

U.S. PATENT DOCUMENTS

| | | |
|---|---|---|
| 6,226,618 B1 | 5/2001 | Downs |
| 6,581,072 B1 | 6/2003 | Mathur et al. |
| 6,587,837 B1 | 7/2003 | Spagna et al. |
| 6,611,812 B2 | 8/2003 | Hurtado et al. |
| 6,859,791 B1 | 2/2005 | Spagna et al. |
| 6,961,467 B2 | 11/2005 | Sirivara et al. |
| 6,983,371 B1 | 1/2006 | Hurtado et al. |
| 7,139,372 B2 | 11/2006 | Chakravorty et al. |
| 7,213,005 B2 | 5/2007 | Mourad et al. |
| 7,353,402 B2 | 4/2008 | Bourne et al. |
| 7,366,687 B2 | 4/2008 | Yoshimine et al. |
| 7,565,332 B2 | 7/2009 | Williams et al. |
| 7,660,749 B2 | 2/2010 | Koshi |
| 7,680,699 B2 | 3/2010 | Porter et al. |
| 7,685,568 B2 | 3/2010 | Brendle |

(Continued)

*Primary Examiner* — Phyllis A Book
(74) *Attorney, Agent, or Firm* — Stetina Brunda Garred & Brucker

(57) ABSTRACT

Certain exemplary embodiments can provide a method that can include: sending software to a first information device and to a second information device, the software adapted to cause display of information regarding user-selected items; and providing content to the software running on the second information device, the software adapted to cause the content to be rendered via the second information device.

4 Claims, 48 Drawing Sheets

(56) References Cited

U.S. PATENT DOCUMENTS

| | | | |
|---|---|---|---|
| 7,853,881 B1* | 12/2010 | Aly Assal | G06Q 30/02 |
| | | | 715/734 |
| 2004/0176080 A1* | 9/2004 | Chakravorty | G06Q 30/0621 |
| | | | 455/414.1 |
| 2005/0021355 A1 | 1/2005 | Brendle | |
| 2005/0022163 A1 | 1/2005 | Brendle | |
| 2009/0106117 A1 | 4/2009 | Porter | |
| 2009/0172565 A1* | 7/2009 | Jackson | H04L 67/1095 |
| | | | 715/753 |
| 2009/0303676 A1* | 12/2009 | Behar | G06F 1/162 |
| | | | 361/679.27 |
| 2010/0251127 A1* | 9/2010 | Geppert | G06F 3/04817 |
| | | | 715/735 |
| 2015/0172228 A1* | 6/2015 | Zalepa | H04L 51/04 |
| | | | 709/206 |

* cited by examiner

FIG. 1

SYSTEMS, DEVICES, AND METHODS FOR SHARING CONTENT

CROSS-REFERENCES TO RELATED APPLICATIONS

The present application is a continuation patent application of U.S. patent application Ser. No. 12/344,290 filed 26 Dec. 2008, which claims priority to now expired U.S. Provisional Patent Application No. 61/016,627, filed 26 Dec. 2007; and incorporates by reference, now abandoned U.S. Non-Provisional patent application Ser. No. 12/103,143, filed 15 Apr. 2008, the entire contents of which are expressly incorporated herein by reference.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 1 is an exemplary illustration of an exemplary user interface.

DETAILED DESCRIPTION

Figure 2:
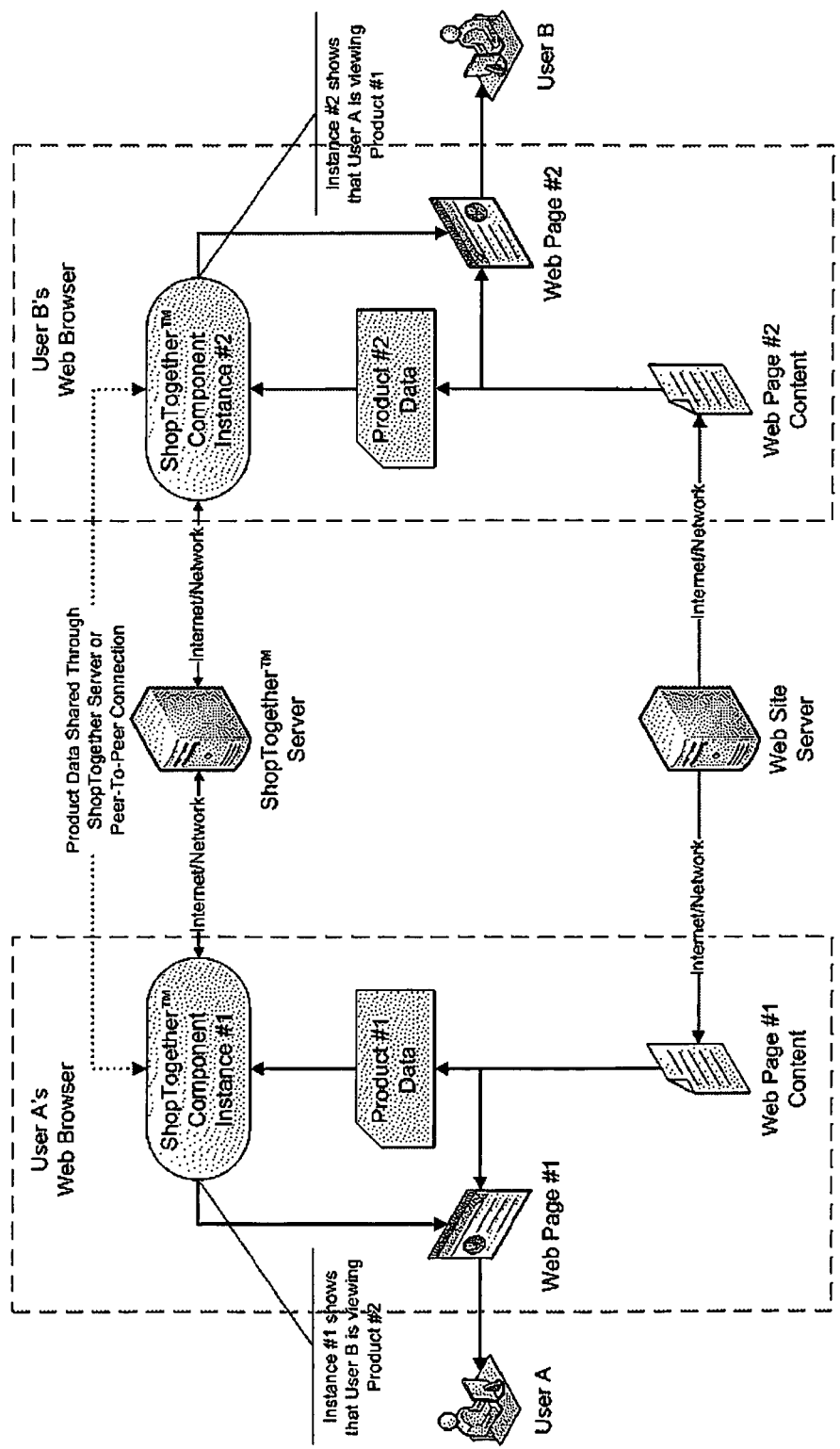
FIG. 2 is an exemplary illustration of an exemplary basic process flow.

Traditional shopping can be a very social experience. There might be multiple decision makers (e.g., a couple buying furniture, a car, a cruise) who will research, compare options, and/or make a decision together. In other cases, there might be one decision maker who wants input from a friend and/or family member (e.g., a mother helping her son buy a car, one friend helping another pick out a digital camera, a daughter helping her father choose a prescription drug plan). In still other cases, two or more people shop together as a form of entertainment and/or social interaction. Additionally, a shopper might look to a customer service representative, sales person, broker, agent, designer, and/or other advisor for assistance in making a decision (e.g., a real estate agent helping a home buyer, a professional decorator helping a couple looking to remodel their home, a car sales person helping an auto buyer, a mortgage broker helping a loan applicant). These types of social shopping activities do not tend to be facilitated well by traditional methods of online shopping. This can create resistance and/or a barrier to purchase in cases where more than one person would normally be involved in making and/or influencing the purchase decision, which can lead to increasing user frustration and/or abandonment rates.

In addition to sharing information related to products and/or services, there can be a social and/or multi-user aspect to the sharing of many other types of information and/or content as well, including but not limited to the sharing of music, video, photos, books, movies, friends, personal and/or professional connections, personal profiles, blogs, articles, web sites, web pages, search engine results, data and/or other similar items and/or content and/or information about music, video, photos, books, movies, friends, personal and/or professional connections, personal profiles, blogs, articles, web sites, web pages, search engine results, data and/or other similar items and/or content.

Social interactions can also help keep users interested and involved with a brand, retailer and/or web site. Interacting with others and even just seeing what product, services, items and/or content other users are viewing can keep users on a web site longer and/or interested and involved with a brand, retailer and/or web site longer. This increased exposure can help increase sales. In some cases, retailers are trying to increase exposure by creating desktop widgets that users can download to their computer. When active, these widgets allow retailers to send advertisements and other promotions directly to a user's desktop. There can be a problem, however, in terms of creating enough incentive for users to download the widget and keep it active on their desktop. Allowing users to share product, services, items and/or other content through such a widget, and even just see how many other users are active and/or what other users are viewing can help provide the incentive to download the widget and keep it active. This can increase the audience to whom retailers can push advertisements and other promotions.

In some cases, such as with confidential information, it may not be possible or appropriate to share certain content between certain users. In these cases, suppression and/or masking of confidential data, information and/or content may be necessary or advisable between different users who are synchronizing and/or sharing content.

Traditional methods for sharing such information often make use of asynchronous postings, such as reviews, ratings, blogs, online profiles, discussion boards and/or other similar methods for posting information that can be viewed at a later time by other users. These methods do not easily allow for the real-time communication that can be such an integral part of social interaction. Where such real-time interaction exists, such as with chat, instant messaging, text messaging and/or other similar systems, shared content typically requires direct user input, such as typing a message. Where other content is passed in real-time using these systems, it is usually shared without much context, such as a simple link to a web page instead of a more robust representation of what information that web page contains. These systems also typically do not pass content in a more automated way than manual user input. Where users are connected in a more automated way, such as with online meeting software, screen sharing software and/or other similar systems, typically only one screen is shared at a time, forcing all connected users browsing a web site, for example, to view the same page at the same time. While the actual screen image is shared using these systems, typically content about the web page(s) being viewed is not shared. Additionally, these types of technology do not typically support the masking of confidential data.

Certain exemplary embodiments comprise and/or provide a system and/or method to allow users in different locations to share content online and/or over a network in real-time and/or near real-time, including but not limited to products, services, music, video, photos, books, movies, friends, personal and/or professional connections, personal profiles, blogs, articles, web sites, web pages, search engine results, data and/or other similar items and/or content and/or information about products, services, music, video, photos, books, movies, friends, personal and/or professional connections, personal profiles, blogs, articles, web sites, web pages, search engine results, data and/or other similar items and/or content.

Certain exemplary embodiments can comprise and/or provide a system and/or method to allow multiple consumers in different locations to share content in real-time and/or near real-time on web site.

Certain exemplary embodiments can comprise and/or provide a system and/or method to allow multiple consumers in different locations to share content in real-time and/or near real-time across multiple web sites.

Certain exemplary embodiments can comprise and/or provide a system and/or method to allow multiple consumers in different locations to shop together for products and/or services in shared real-time and/or near real-time sessions in groups of two or more people. Certain exemplary embodiments can provide shared shopping sessions between a user and friends, family, other consumers, customer service representatives, sales people, brokers, agents, designers and/or other advisors.

Certain exemplary embodiments can comprise and/or provide a system and/or method to allow multiple consumers in different locations to shop together in real-time and/or near real-time on a retail and/or ecommerce web site.

Certain exemplary embodiments can comprise and/or provide a system and/or method to allow multiple consumers in different locations to shop together in real-time and/or near real-time across multiple retail and/or ecommerce web sites.

Certain exemplary embodiments can comprise and/or provide a system and/or method to allow multiple consumers in different locations to shop together in real-time and/or near real-time in a virtual shopping mall.

Certain exemplary embodiments can comprise and/or provide a system and/or method to allow multiple consumers in different locations to participate in real-time and/or near real-time group shopping events.

Certain exemplary embodiments can comprise and/or provide a system and/or method to allow users of and/or visitors to and/or members of social networking sites, content sharing sites, product comparison sites, product review sites, price comparison sites, travel sites, real estate sites, automobile sites, auction sites, health care sites, insurance sites, financial sites, internet search sites and/or other similar web sites to shop and/or share content together with friends, family, other users, other members and/or other visitors and/or to shop and/or share content with a customer service representative, sales person, broker, agent, dealer, designer, and/or other advisor in real-time and/or near real-time. Certain exemplary embodiments can allow such group shopping and/or content sharing capability to extend to products, services, items and/or content offered by retail, ecommerce and/or other web sites beyond the actual site offering its user, visitors and/or members the ability to share content in real and/or near real time.

Certain exemplary embodiments can comprise and/or provide a system and/or method to allow businesses that develop and/or provide ecommerce, catalog, customer support, search, call center support, chat-based support, content management, content sharing, blogging, chat, discussion board, internet browser, operating system, screen sharing, online meeting, instant message, email, media player, media jukebox, desktop widget, social networking and/or other similar software and/or systems for themselves and/or for others to offer the capability for users to shop and/or share content together and/or shop and/or share content with a customer service representative, sales person, broker, agent, designer, and/or other advisor in real-time and/or near real-time on web sites.

Transmission of Shared Content

Certain exemplary embodiments can make use of a messaging server (similar to that found in Adobe Flex) and/or a chat server and/or other such similar mechanism to connect multiple instances of online and/or desktop software applications and/or components in a way that allows users to share content in real-time and/or near real-time. Certain exemplary embodiments can have a server automatically generate a unique messaging/chat ID for each session.

Certain exemplary embodiments can make use of peer-to-peer connections and/or other such similar mechanism to connect multiple instances of online and/or desktop software applications and/or components in a way that allows users to share content in real-time and/or near real-time.

Certain exemplary embodiments can allow instances of online and/or desktop software applications and/or components to broadcast content and/or updates to other instances of online and/or desktop software applications and/or components.

Certain exemplary embodiments can allow instances of online and/or desktop software applications and/or components to request content and/or updates from other instances of online and/or desktop software applications and/or components.

Certain exemplary embodiments can make use of a centralized database(s) and/or text files(s) and/or other such similar mechanism to store shared content with each user's instance making periodic updates to and/or calls from the centralized storage mechanism to connect multiple instances of online and/or desktop software applications and/or components in a way that allows users to share content in real-time and/or near real-time. Certain exemplary embodiments can locate such a database(s) and/or text files(s) and/or other such similar mechanism on a centralized server. Certain exemplary embodiments can make use of a user ID, session ID, messaging ID, chat ID and/or other similar identifier to store and/or retrieve shared content from a centralized database(s) and/or text files(s) and/or other such similar mechanism.

Certain exemplary embodiments can make use of a centralized database(s) and/or text files(s) and/or other such similar mechanism to store shared content with each user's instance making periodic updates to the centralized storage mechanism and with each user's instance being prompted to check for such centrally stored updates by a broadcast message, indicating that an update has been made, from another user's instance made through a messaging server (similar to that found in Adobe Flex) and/or a chat server and/or peer-to-peer connection and/or other such similar mechanism in order to connect multiple instances of online and/or desktop software applications and/or components in a way that allows users to share content in real-time and/or near real-time.

Certain exemplary embodiments can make use of a centralized database(s) and/or text files(s) and/or other such similar mechanism to store shared content with each user's instance making periodic updates to and/or calls from the centralized storage mechanism and with each user's instance also being updated by a broadcast message from another user's instance made through a messaging server (similar to that found in Adobe Flex) and/or a chat server and/or peer-to-peer connection and/or other such similar mechanism in order to connect multiple instances of online and/or desktop software applications and/or components in a way that allows users to share content in real-time and/or near real-time.

Client-Side Instance

Certain exemplary embodiments can implement the user interface and/or client-side instance of the software application(s) and/or component(s) within a web browser and/or as part of a web page and/or web site and/or as a component on and/or in and/or connected to a web page and/or web site and/or by other similar mechanism. Certain exemplary embodiments may implement the user interface and/or client-side instance as a toolbar, component, plug-in, object and/or other similar mechanism added to a web browser. Certain exemplary embodiments may implement the user interface and/or client-side instance as a toolbar, component, popup, object and/or other similar mechanism within a web site and/or a web page.

Certain exemplary embodiments can implement the user interface and/or client-side instance of the software applications and/or components using HTML, DHTML, Java, JavaScript, AJAX, Flash, Flex, .NET and/or other similar technology, programming language, development environment and/or method for creating and/or deploying software applications and/or components on a client device.

Certain exemplary embodiments can reload and/or otherwise re-instantiate the user interface and/or client-side instance of the software application(s) and/or component(s) when each page and/or multiple pages within a web site and/or across multiple web sites are loaded into and/or called by a user's browser and/or other similar mechanism. Certain exemplary embodiments can save and/or store the shared content locally on the user's system in a cookie, shared object, file and/or other similar mechanism in order to reload the shared content when the user interface and/or client-side instance is reloaded and/or otherwise re-instantiated on a new web page so that the previously saved and/or stored content appears quickly and then the user interface and/or client-side instance, once loaded and/or otherwise instantiated, can check for new updates and/or content from other users and/or a central storage mechanism.

Certain exemplary embodiments can automatically reconnect to the shared real-time and/or near real-time session when the user interface and/or client-side instance of the software application(s) and/or component(s) is reloaded and/or otherwise re-instantiated when each page and/or multiple pages within a web site and/or across multiple web sites are loaded into and/or called by a user's browser and/or other similar mechanism. Certain exemplary embodiments can save and/or store a user ID, session ID, messaging ID, chat ID and/or other similar identifier used to established and/or define a shared connection in a cookie, shared object, file and/or other similar mechanism locally on the user's system in order to automatically reconnect to the correct shared real-time and/or near real-time session.

Certain exemplary embodiments can implement the user interface and/or client-side instance of the software application(s) and/or component(s) as a desktop application and/or as a component on and/or in and/or connected to a desktop application. Certain exemplary embodiments can implement the user interface and/or client-side instance as a desktop widget.

In cases where the user interface and/or client-side instance of the software application(s) and/or component(s) has been implemented as a desktop application and/or component on and/or in and/or connected to a desktop application and/or as a desktop widget, certain exemplary embodiments can also implement a separate instance of a software application(s) and/or component(s) within a web browser and/or as part of a web page and/or web site and/or as a component on and/or in and/or connected to a web page and/or web site and/or by other similar mechanism on the same computer and/or client-side device. Certain exemplary embodiments can connect these two instances in order to pass information and/or execute actions between the desktop application, component and/or widget and the web browser, web site and/or web page application and/or component.

Certain exemplary embodiments can allow a user interface and/or client-side instance of the software application(s) and/or component(s) to display the number of users currently active and/or connected in a shared real-time and/or near real-time session.

Certain exemplary embodiments can allow a user interface and/or client-side instance of the software application(s) and/or component(s) to display which and/or how many users from a certain subset list are currently active and/or connected in a shared real-time and/or near real-time session.

Certain exemplary embodiments can implement the user interface and/or client-side instance of the software application(s) and/or component(s) on a computer kiosk, in-store terminal and/or other similar device.

Certain exemplary embodiments can implement the user interface and/or client-side instance of the software application(s) and/or component(s) on a mobile phone PDA, mobile device and/or other similar device.

Certain exemplary embodiments can implement the user interface and/or client-side instance of the software application(s) and/or component(s) on a television and/or other similar device. Certain exemplary embodiments can implement the user interface and/or client-side instance of the software application(s) and/or component(s) through a television receiver, satellite receiver, game system and/or other similar device.

Certain exemplary embodiments can allow different users connected in a shared real-time and/or near real-time session to use different versions, layouts and/or configurations of the interface and/or client-side instance of the software application(s) and/or component(s). Certain exemplary embodiments can allow one connected version, layout and/or configuration of the interface and/or client-side instance of the software application(s) and/or component(s) to have more, less and/or different functionality and/or capability than other connected versions, layouts and/or configurations.

Sources of Content

Certain exemplary embodiments can allow users to share content in real-time and/or near real-time that is obtained directly from web pages and/or from content tags, programming tags, XML tags, URLs, scripts and/or components on and/or in and/or connected to web pages and/or from XML files, Web Services, RSS feeds, data files, content files and/or databases and/or from interaction with applications and/or components and/or other similar data and/or content sources.

The following is an exemplary illustration of product data integrated into a script on retailer's web page in a manner that can be accessed by a user interface and/or client-side instance of the software application(s) and/or component(s) and shared between users in a real-time and/or near real-time session.

```
<script language="javascript">
    ShopTogether.itemId="99";
    ShopTogether.itemName="Swivel Bar Stool";
    ShopTogether.itemImage="http://image.domain.com/prod_99.jpg";
    ShopTogether.itemPrice="$209.00";
    ShopTogether.itemLink="http://www.domain.com/prod_99.htm";
    ShopTogether.Initialize( );
```

The following is an exemplary illustration of product data integrated into meta tags on retailer's web page in a manner that can be accessed by a user interface and/or client-side instance of the software application(s) and/or component(s) and shared between users in a real-time and/or near real-time session.

```
<meta name="ShopTogetherItemId" content="99">
<meta name="ShopTogetherItemName" content="Swivel Bar Stool">
<meta name="ShopTogetherItemImage" content="http://image.domain.com/prod_99.jpg">
<meta name="ShopTogetherItemPrice" content="$209.00">
<meta name="ShopTogetherItemLink" content="http://www.domain.com/prod_99.htm">
```

The following is an exemplary illustration of product data integrated into a retailer's web page URL in a manner that can be accessed by a user interface and/or client-side instance of the software application(s) and/or component(s) and shared between users in a real-time and/or near real-time session.

```
http://www.domain.com/prod_99.htm?ShopTogetherItemId=99&ShopTogetherItemName=Swivel
%20Bar%20Stool&ShopTogetherItemImage=http%3A%2F%2Fimage.domain.com%2Fprod_99.jpg&Sh
opTogetherItemPrice=%24209.00&ShopTogetherItemLink=http%3A%2F%2Fwww.domain.com%2Fpr
od_99.htm
```

Certain exemplary embodiments can allow users to share content in real-time and/or near real-time that is obtained with a content ID, data key, product ID and/or other similar identifier obtained from web pages and/or from content tags, programming tags, URLs, scripts and/or components on and/or in and/or connected to web pages and/or from XML files, Web Services, RSS feeds, data files, content files and/or databases and/or from interaction with applications and/or components and/or other similar data and/or content sources and with such an identifier used to retrieve additional content and/or data from another source.

Certain exemplary embodiments can allow users to share content in real-time and/or near real-time that is obtained by using all and/or part of a web page URL, URL parameter, document location, file path and/or other similar indicator of content location as an identifier used to retrieve additional content and/or data from another source.

Certain exemplary embodiments can allow users to share content in real-time and/or near real-time that is obtained by scanning bar codes, reading RFID tags, entering product codes and/or using other similar identifiers found on products and/or product packaging to retrieve additional content and/or data from another source.

Certain exemplary embodiments can allow users connected in shared real-time and/or near real-time sessions to share content from multiple different web pages, web sites, XML files, Web Services, RSS feeds, data files, content files, databases, interaction with other applications and/or components and/or other similar data and/or content sources. Certain exemplary embodiments can allow one user to be sharing content from one or more such sources while other users connected in the same session are sharing content from one or more different sources. Certain exemplary embodiments can allow connected users to view the source of the content in addition to and/or in place of the actual content being shared.

Certain exemplary embodiments can allow users connected in shared real-time and/or near real-time sessions to share products, services, items and/or content from multiple different retailers. Certain exemplary embodiments can allow one user to be sharing content from one or more such retailers while other users connected in the same session are sharing content from one or more different retailers. Certain exemplary embodiments can allow connected users to view a representation of the retailer such as a name and/or logo in addition to and/or in place of the actual products, services, items and/or content being shared.

Certain exemplary embodiments can allow for certain groups of users connected in shared real-time and/or near real-time sessions to only share content from certain sources and/or to only share certain content from a particular source. Certain exemplary embodiments can allow for different such content sharing rules and/or restrictions between different users, even within the same shared session. Certain exemplary embodiments can allow User A to share certain content with User B but not with User C in the same shared session.

Certain exemplary embodiments can allow visitors to and/or users of a web site already connected in a shared real-time and/or near real-time session with one or more other users to invite other people to connect with the them and/or with the group in the existing shared real-time and/or near real-time session.

Certain exemplary embodiments can allow visitors to and/or users of a web site already connected in a shared real-time and/or near real-time session with a customer service representative, sales person, broker, agent, designer, and/or other advisor to invite other people to connect with the them and/or with the group in the existing shared real-time and/or near real-time session. Certain exemplary embodiments can allow a customer service representative, sales person, broker, agent, designer, and/or other advisor already connected in a shared real-time and/or near real-time session with visitors to and/or users of a web site to invite other people to connect with the them and/or with the group in the existing shared real-time and/or near real-time session.

Connecting Users

Certain exemplary embodiments can allow for the connection of unregistered and/or anonymous users in shared real-time and/or near real-time sessions.

Certain exemplary embodiments can allow visitors to and/or users of a web site to invite other people to connect with them in a shared real-time and/or near real-time session.

Certain exemplary embodiments can allow a customer service representative, sales person, broker, agent, designer, and/or other advisor to invite customers to connect with them in a shared real-time and/or near real-time session. Certain exemplary embodiments can allow a user to request to connect with a customer service representative, sales person, broker, agent, designer, and/or other advisor in a shared real-time and/or near real-time session.

Certain exemplary embodiments can allow for establishing connections and/or recommending connections between registered users in shared real-time and/or near real-time sessions.

Certain exemplary embodiments can establish connections and/or recommend connections between users on a site and/or automatically connect users on a site and/or prompt and/or otherwise enable users on a site to connect in a shared real-time and/or near real-time session based on mutual agreement, mutual personal network connections, mutual interests, user profiles, previous purchases, previous searches, other previous actions and/or behavior and/or other similar methods for establishing connections and/or relationships between users.

Certain exemplary embodiments can allow for the registration and/or profiling and/or linking of users specifically for the purpose of establishing connections and/or recommending connections in shared real-time and/or near real-time sessions. Certain exemplary embodiments make use existing user registrations, user profiles and/or links between users for use in establishing connections and/or recommending connections in a shared real-time and/or near real-time session.

Certain exemplary embodiments can allow for the creation of one-time shared real-time and/or near real-time sessions between multiple users.

Certain exemplary embodiments can allow users to connect in a shared real-time and/or near real-time sessions by exchanging a code, URL, link, email, text message, instant message and/or other similar method for identifying and/or communicating a shared session and/or session identifier and/or session location between multiple users.

Certain exemplary embodiments can automatically reconnect users and/or prompt and/or otherwise enable users to reconnect in a shared real-time and/or near real-time sessions based on previously established connections.

Certain exemplary embodiments can allow for the creation of relationships between multiple users that automatically connect users and/or prompt and/or otherwise enable users to connect in a shared real-time and/or near real-time sessions whenever two or more linked users are active in the system at the same time.

Certain exemplary embodiments can automatically connect active users in a shared real-time and/or near real-time session in order to share content. Certain exemplary embodiments can allow two or more user to break off from a larger and/or more public shared real-time and/or near real-time session and form a smaller and/or more private shared real-time and/or near real-time session in order to share content. Certain exemplary embodiments can allow users who have joined such smaller and/or more private breakout sessions to rejoin the larger and/or more public shared session.

Certain exemplary embodiments can allow users to participate in and/or share content in more than one shared real-time and/or near real-time sessions at the same time.

Certain exemplary embodiments can allow a user that is connected with another user and/or users in a shared real-time and/or near real-time sessions to have temporary privacy by turning on and/or off the broadcast and/or sharing of shared content to the rest of the group without disconnecting from the group. Certain exemplary embodiments can allow a user that has temporarily turned off the broadcast and/or sharing of shared content to still view the shared content from other members of the group. Certain exemplary embodiments can allow users to automatically turn off the broadcast and/or sharing of shared content based on content type, content source, content attributes, keywords, and/or other similar method for identifying and/or profiling content that should not be broadcast and/or shared.

Interacting with Shared Content

Certain exemplary embodiments can allow users connected in shared real-time and/or near real-time sessions to view a representation of the product, service, item and/or content that each, one, some and/or all other connected user(s) are currently viewing, such as a name, description, image, price and/or other similar information that serves to represent the product, service, item and/or content in whole or in part.

Certain exemplary embodiments can automatically broadcast a new and/or updated representation of the product, service, item and/or content to other users in the shared session whenever the product, service, item and/or content that a user is viewing changes.

Certain exemplary embodiments can represent a web page that contains information about a product, service, item and/or content and/or the ability to view and/or access a product, service, item and/or content and/or the ability to purchase and/or otherwise obtain a product, service, item and/or content with a representation of the product, service, item and/or content, such as a name, description, image, price and/or other similar information. Certain exemplary embodiments can include such a URL and/or other link to the same and/or to a different web page as part of the information representing the product, service, item and/or content that is shared between users.

Certain exemplary embodiments may change the information used to represent a particular web page and/or broadcast an update if the content of that page is changed by the user. Certain exemplary embodiments might trigger and broadcast such a change when a user changes the color option for a product while remaining on the same product web page.

Certain exemplary embodiments can allow users connected in shared real-time and/or near real-time sessions to create a shared list and/or lists of products, services, items and/or content that can be viewed by other users connected in the same session and/or in related sessions. Certain exemplary embodiments can allow these shared lists to be also accessed by users when not connected in shared real-time and/or near real-time sessions.

Certain exemplary embodiments can allow users to create lists of products, services, items and/or content prior to connection and/or access lists created prior to connection and then to share such previously created lists with other users subsequently connected in a shared real-time and/or near real-time session. Certain exemplary embodiments can allow such shared lists to be exported to, imported from and/or otherwise connected directly and/or indirectly to another system such as a wish list, wedding registry, favorites list and/or other similar list and/or system.

Certain exemplary embodiments can allow users connected in a shared real-time and/or near real-time session to directly add items to and/or manage items in another system such as a wish list, wedding registry, favorites list and/or other similar list and/or system.

Certain exemplary embodiments can allow a user to drag and drop a representation of a shared product, service, item and/or content, such as a name, description, image, price and/or other similar information that serves to represent the product, service, item and/or content in whole or in part, from within the actual user interface and/or client-side instance and/or from a web page, web page content, popup, window, application, component, screen and/or other electronic interface in order to add it to a shared list and/or lists, and/or in order to add it to another system such as a wish list, wedding registry, favorites list and/or other similar list and/or system.

Certain exemplary embodiments can allow a user in a shared real-time and/or near real-time session to click on, mouse over and/or otherwise activate a representation of a shared product, service, item and/or content, such as a name, description, image, price and/or other similar information that serves to represent the product, service, item and/or content in whole or in part, and then open and/or otherwise be directed to a web page, popup, window, application, component, screen and/or other electronic interface that contains the actual product, service, item and/or content and/or more information about the product, service, item and/or content and/or the ability to view and/or access the product, service, item and/or content and/or the ability to purchase and/or otherwise secure the product, service, item and/or content. Certain exemplary embodiments include such a URL and/or other link as part of the information representing the product, service, item and/or content that is shared between users.

Redirecting Users

Certain exemplary embodiments can allow a user in a shared real-time and/or near real-time session to redirect another user and/or users in the same session to a web page, popup, window, application, component, screen and/or other electronic interface that contains a product, service, item and/or content and/or more information about a product, service, item and/or content and/or the ability to view and/or access a product, service, item and/or content and/or the ability to purchase and/or otherwise obtain a product, service, item and/or content. Certain exemplary embodiments include such a URL and/or other link used for redirection as part of the information representing product, service, item and/or content that is shared between users. Certain exemplary embodiments prompt the user and/or users to accept and/or decline the redirection. Certain exemplary embodiments can allow a user to always accept redirection.

Certain exemplary embodiments can allow a user to synchronize with another user in their session so that the user is automatically redirected to the web page, popup, window, application, component, screen and/or other electronic interface that the other user is viewing as that web page, popup, window, application, component, screen and/or other electronic interface changes in whole or in part.

Certain exemplary embodiments can allow a user to drag and drop a representation of a product, service, item and/or content, such as a name, description, image, price and/or other similar information that serves to represent the product, service, item and/or content in whole or in part, from within the actual user interface and/or client-side instance and/or from a web page, popup, window, application, component, screen and/or other electronic interface content to a representation of another user, such as a name, screen name, image, avatar and/or other such representation, in order to redirect the other user to a web page, popup, window, application, component, screen and/or other electronic interface that contains the product, service, item and/or content and/or more information about the product, service, item and/or content and/or the ability to view and/or access the product, service, item and/or content and/or the ability to purchase and/or otherwise secure the product, service, item and/or content.

Product-Based Chat

Certain exemplary embodiments can have the capability for chat-style communications between users in a shared real-time and/or near real-time session. Certain exemplary embodiments can allow a user to drag and drop a representation of a shared product, service, item and/or content, such as a name, description, image, price and/or other similar information that serves to represent the product, service, item and/or content in whole or in part, to a chat-style interface from within the actual user interface and/or client-side instance and/or from a web page, popup, window, application, component, screen and/or other electronic interface in order to send a representation of the product, service, item and/or content as a chat-style message. Certain exemplary embodiments will create a link within the chat-style message to a web page, popup, window, application, component, screen and/or other electronic interface that contains the product, service, item and/or content and/or more information about the product, service, item and/or content and/or the ability to view and/or access the product, service, item and/or content and/or the ability to purchase and/or otherwise secure the product, service, item and/or content.

Other Capabilities

Certain exemplary embodiments can allow users in shared real-time and/or near real-time sessions to add ratings, reviews and/or other similar comments to products, services, items and/or content that they and/or other users in their shared session are viewing, have viewed, have added to a shared list and/or have otherwise interacted with. Certain exemplary embodiments can allow for these ratings, reviews and/or other similar content that are created during a shared session to be saved and/or used outside of the shared session and/or distributed to others and/or linked directly and/or indirectly with other systems.

Certain exemplary embodiments can integrate with and/or otherwise connect to ecommerce, catalog, shopping cart and/or checkout systems to allow users to purchase products, services, items and/or content while in shared real-time and/or near real-time sessions.

Certain exemplary embodiments can integrate with and/or otherwise connect to ecommerce, catalog, shopping cart and/or checkout systems to allow users to purchase products, services, items and/or content while in shared real-time and/or near real-time sessions directly from the user interface and/or client-side instance of the software application(s) and/or component(s) and/or from another component, popup, page and/or similar interface called by and/or controlled by the user interface and/or client-side instance of the software application(s) and/or component(s).

Certain exemplary embodiments can allow programming scripts, functions, variables, APIs and/or other similar programming commands and/or calls to be initiated and/or executed across a shared real-time and/or near real-time session connection. Certain exemplary embodiments can allow for data, variables, objects, XML, indicators of success and/or failure and/or other similar responses to be returned when such a command and/or call is initiated and/or executed across a shared real-time and/or near real-time session connection.

Certain exemplary embodiments can allow users to synchronize and/or share content between multiple instances of registration forms, application forms, shopping carts, checkout interfaces and/or other similar transactional interfaces connected in a real-time and/or near real-time session between a user and one or more friends, family, other consumers, customer service representatives, sales people, brokers, agents, designers and/or other advisors.

Certain exemplary embodiments can allow users to synchronize and/or share content between multiple instances of multi-step registration forms, application forms, shopping carts, checkout interfaces and/or other similar transactional interfaces connected in a real-time and/or near real-time session between a user and one or more friends, family, other consumers, customer service representatives, sales people, brokers, agents, designers and/or other advisors.

Certain exemplary embodiments can allow for different interfaces for different users who are synchronizing and/or sharing content between multiple instances of multi-step registration forms, application forms, shopping carts, checkout interfaces and/or other similar transactional interfaces connected in a real-time and/or near real-time session between a user and one or more friends, family, other consumers, customer service representatives, sales people, brokers, agents, designers and/or other advisors.

Certain exemplary embodiments can allow for the suppression and/or masking of confidential data, information and/or content between different users who are synchronizing and/or sharing content between multiple instances of registration forms, application forms, shopping carts, checkout interfaces and/or other similar transactional interfaces connected in a real-time and/or near real-time session between a user and one or more friends, family, other consumers, customer service representatives, sales people, brokers, agents, designers and/or other advisors.

Figure 1:
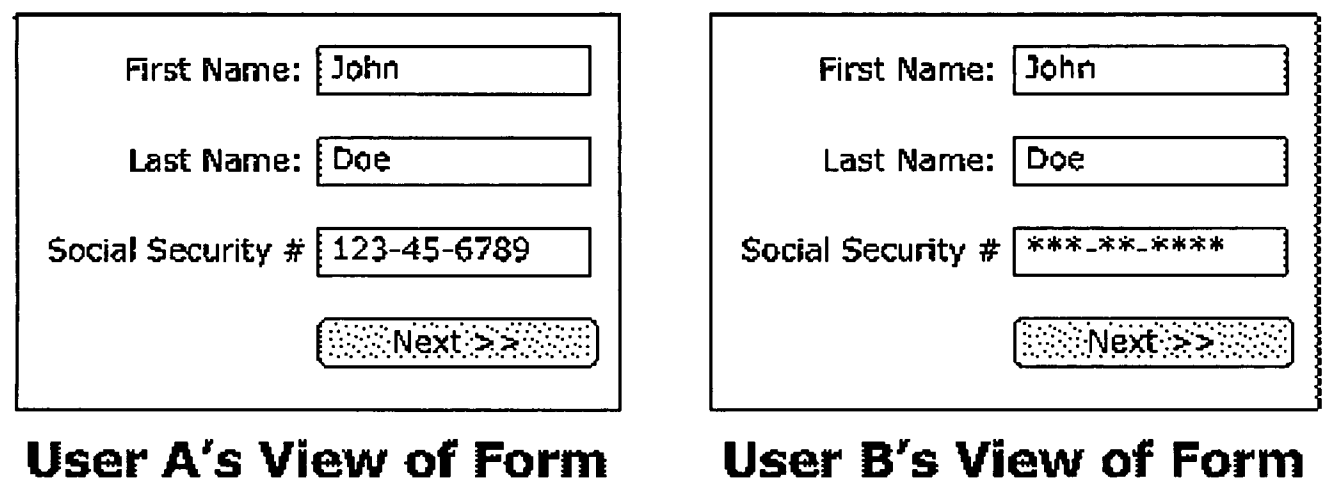

FIG. 1 is an exemplary illustration of the suppression and/or masking of confidential data, information and/or content between different users who are synchronizing and/or sharing content between multiple instances of a registration form.

Certain exemplary embodiments can allow users to post information and/or content and/or product from a shared real-time and/or near real-time session directly and/or indirectly to a public and/or private user profile, web page, web site, blog, rating system, review system and/or other similar location and/or system on a social networking site, content sharing site, ecommerce site, blog site and/or other similar system and/or network in a manual and/or automated manner.

Certain exemplary embodiments can connect to and/or integrate with affiliate network, commission tracking, coupon and/or other similar systems to track, assign, manage, distribute and/or collect commissions resulting from purchases made by users in a shared real-time and/or near real-time session and/or who have previously been in a shared real-time and/or near real-time session.

Certain exemplary embodiments can integrate with multi-user product selection applications and/or other similar systems, devices and methods for supporting decisions.

Certain exemplary embodiments can integrate with online meeting and/or other similar screen sharing technologies and/or systems.

Advertising

Certain exemplary embodiments can deliver advertising and/or promotions to users in shared real-time and/or near real-time sessions.

Certain exemplary embodiments can connect to and/or integrate with advertising delivery, tracking and/or other similar systems to deliver advertising to users in shared real-time and/or near real-time sessions.

Certain exemplary embodiments can deliver advertisements to users in a shared real-time and/or near real-time session based on the content type, content source, content attributes and/or keywords, and/or other similar method for identifying and/or profiling content that one or more of the users is viewing, has viewed, is sharing and/or has shared during the current and/or previous shared sessions.

Certain exemplary embodiments can deliver advertisements to users in a shared real-time and/or near real-time session based on the retailer, web site, products and/or services that one or more of the users is viewing, has viewed, is sharing and/or has shared during the current and/or previous shared sessions.

Certain exemplary embodiments can deliver, track and/or consider the shared representation of a product, service, item and/or content viewed and/or shared by one or more users in a shared real-time and/or near real-time session as an advertisement to the other users viewing the shared representation for the purposes of measuring and/or billing impressions and/or click-throughs.

Process Flows and Scenarios

FIG. 2 is an exemplary illustration of an exemplary basic process flow for an implementation of the User Interface as a component, object and/or toolbar embedded into and/or otherwise connected to a web page. In general, components of the User Interface can be served upon request from a server to a User's browser and/or other similar client-side application. Multiple instances of the User Interface components on different computers can be connected in shared real-time and/or near real-time sessions through a server. Content from a web page, including a representation of a product displayed on the web page, can be accessed by a User Interface component and shared between multiple instances of connected User Interface components in real-time and/or near real-time. When a User views a different web page, different content and/or representations can be accessed by the User Interface component and shared between multiple instances of connected User Interface components in real-time and/or near real-time.

The key steps in the process are:
1. Embed a toolbar downloaded from a server into the pages of a retailer's web site when customers open those pages.
2. Connect User A's instance of the toolbar to User B's instance of the toolbar.
3. Have the embedded toolbars read content tags placed in the opened web pages.
4. Have the toolbars share the content tags between User A and User B through the established connection.
5. Have User A's toolbar display User B's content and User B's toolbar display User A's content.
6. Reload the toolbar on each web page as the users change pages on the retailer's site.
7. Maintain the connection as each user's toolbar reloads when the users change pages.
8. Transmit the new page's content tags to the other user through the connection.

Figure 3:
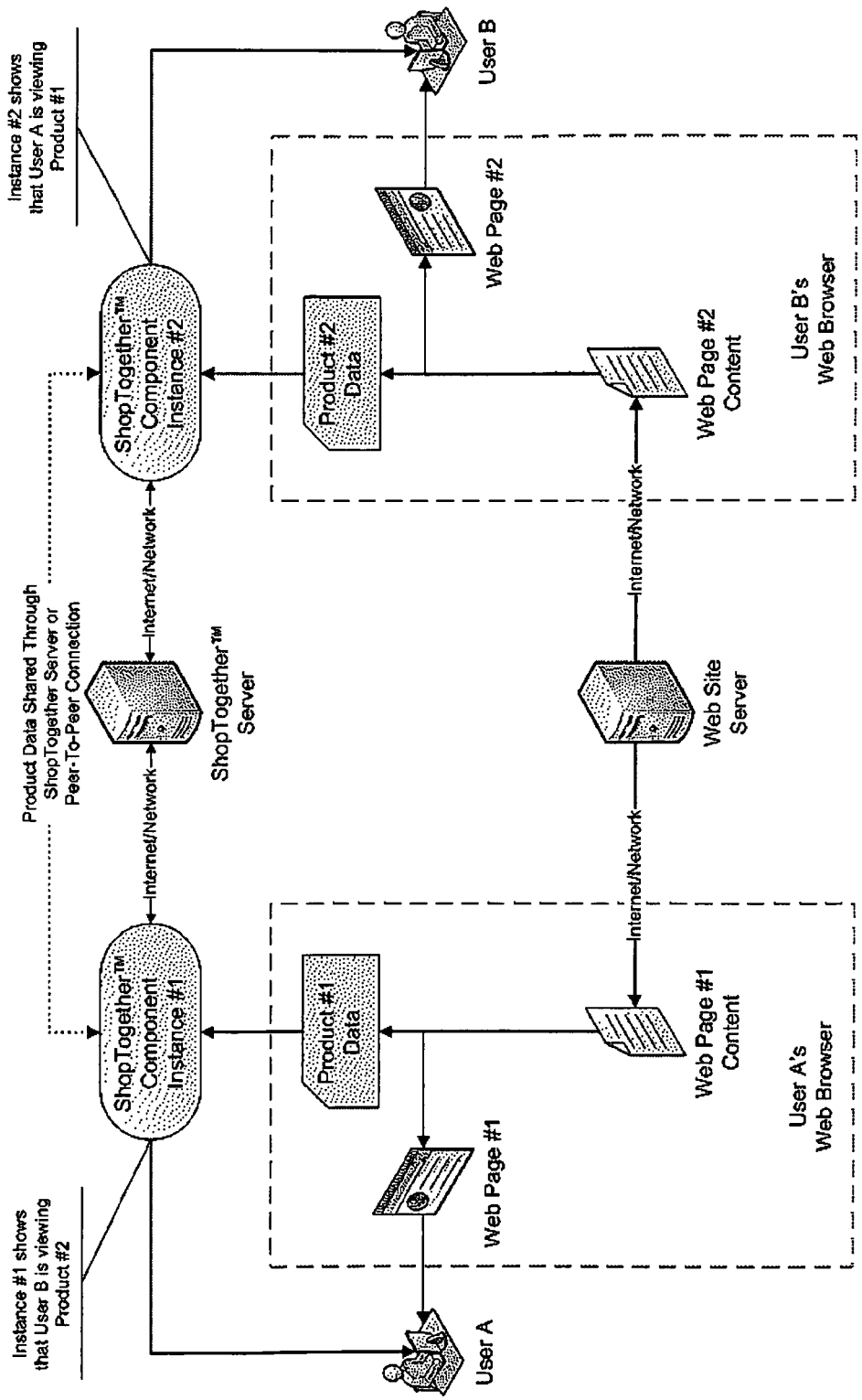
FIG. 3 is an exemplary illustration of an exemplary basic process flow.

FIG. 3 is an exemplary illustration of an exemplary basic process flow for an implementation of the User Interface as a desktop application, component and/or widget. In general, components of the User Interface can be served upon request from a server to a User's browser and/or otherwise installed, implemented or instantiated as a desktop application, component, widget and/or other similar client-side application. Multiple instances of the User Interface components on different computers can be connected in shared real-time and/or near real-time sessions through a server. Content from a web page, including a representation of a product displayed on the web page, can be accessed by a User Interface component and shared between multiple instances of connected User Interface components in real-time and/or near real-time. When a User views a different web page, different content and/or representations can be accessed by the User Interface component and shared between multiple instances of connected User Interface components in real-time and/or near real-time.

Figure 4:
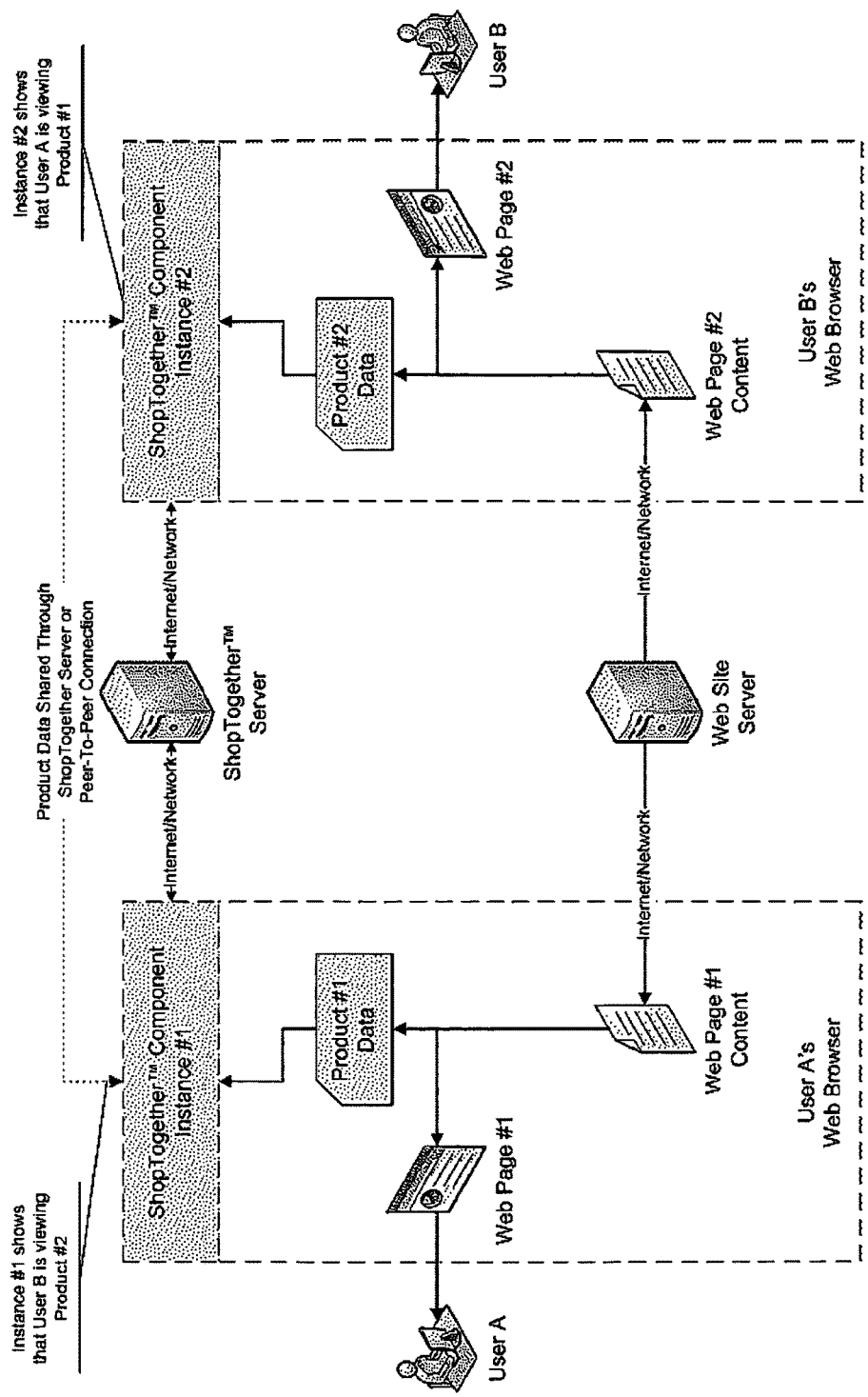
FIG. 4 is an exemplary illustration of an exemplary basic process flow.

FIG. 4 is an exemplary illustration of an exemplary basic process flow for an implementation of the User Interface as a component, toolbar or similar object in a web browser application. In general, components of the User Interface can be served upon request from a server to a User's browser and/or otherwise installed, implemented or instantiated as a web browser application component, toolbar and/or other similar object. Multiple instances of the User Interface components on different computers can be connected in shared real-time and/or near real-time sessions through a server. Content from a web page, including a representation of a product displayed on the web page, can be accessed by a User Interface component and shared between multiple instances of connected User Interface components in real-time and/or near real-time. When a User views a different web page, different content and/or representations can be accessed by the User Interface component and shared between multiple instances of connected User Interface components in real-time and/or near real-time.

Figure 5:
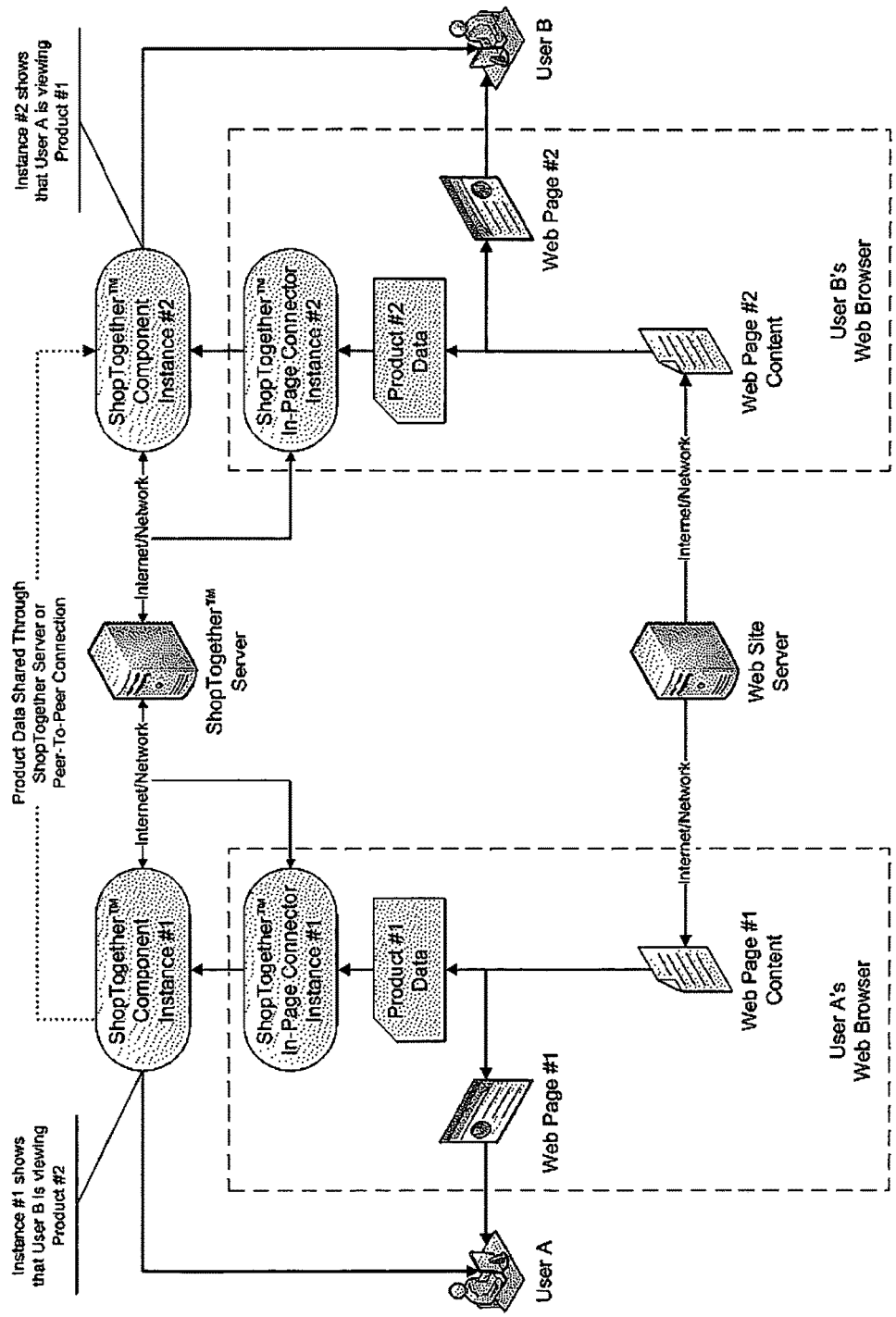
FIG. 5 is an exemplary illustration of an exemplary basic process flow.

FIG. 5 is an exemplary illustration of an exemplary basic process flow for an implementation of the User Interface as a desktop application, component and/or widget communicating with a separate instance of a software application(s) and/or component(s) within a web browser and/or as part of a web page and/or web site and/or as a component on and/or in and/or connected to a web page and/or web site and/or by other similar mechanism on the same computer and/or client-side device. In general, components of the User Interface can be served upon request from a server to a User's browser and/or otherwise installed, implemented or instantiated as a desktop application, component, widget and/or other similar client-side application. In general, a second component can be served upon request from a server to a User's browser. These two instances on the same computer and/or client-side device can be connected in order to pass information and/or execute actions between the desktop application, component and/or widget and the web browser, web site and/or web page application and/or component. Multiple instances of the components on different computers can be connected in shared real-time and/or near real-time sessions through a server. Content from a web page, including a representation of a product displayed on the web page, can be accessed by a component and shared between multiple instances of connected components in real-time and/or near real-time. When a User views a different web page, different content and/or representations can be accessed by the components and shared between multiple instances of connected components in real-time and/or near real-time.

Additional potential simplified process flow descriptions are provided below:

Scenario #1 (Multi-User Online Retail Shopping by Invitation). One exemplary embodiment called ShopTogether™ can allow users to shop together in a shared real-time and/or near real-time session on a retailer's web site. A potential simplified process flow for this exemplary embodiment can comprise such activities as:

1. "User A" visits the retailer's web site on which ShopTogether™ has been implemented using a web browser application on "User A's" computer and clicks on a link to initiate the ShopTogether™ component.
2. The ShopTogether™ component opens in the web page header and "User A" is prompted to enter his/her name and then click the "Next" button. Once initiated, the ShopTogether™ component remains open on each page that "User A" visits on the retailer's web site.
3. "User A" is then prompted to select "Invite a Friend" or "Join a Friend".
4. Being the user that is initiating the shared session, "User A" selects "Invite a Friend" and is prompted with the instructions to "Call or email your friend and have them visit this site. They should select Join a Friend in ShopTogether™ and enter this code". On the same screen "User A" is presented with a ShopTogether™ code to give to "User B".
5. "User A" calls "User B" on the telephone, invites "User B" to shop with "User A" on the retailer's web site and provides the instructions and ShopTogether™ code. Alternatively, "User A" could contact "User B" by email, chat, text message, instant message or other similar method.
6. "User B" in a different physical location and on the telephone with "User A" visits the retailer's web site using a web browser application on "User B's" computer and clicks on a link to initiate the ShopTogether™ component.
7. The ShopTogether™ component opens in the webpage header and "User B" is prompted to enter his/her name and then click the "Next" button. Once initiated, the ShopTogether™ component remains open on each page that "User B" visits on the retailer's web site.
8. "User A" is then prompted to select "Invite a Friend" or "Join a Friend".
9. Having been invited by "User A", "User B" then clicks "Join a Friend" and is prompted to enter the ShopTogether™ code provided by "User A". "User B" then clicks the "Next" button.
10. "User B" waits while the ShopTogether™ server establishes a connection the "User A".
11. After providing the ShopTogether™ code, "User A" clicks the "Next" button and waits for a connection to "User B" to be established through the ShopTogether™ server.
12. Once "User B" has connected, the ShopTogether™ component activates an area where "User A" can see what product "User B" is currently viewing or that "User B" currently has no product selected.
13. "User A" can then visit a product page on the retailer's web site and "User B" can see what product "User A" is currently viewing by looking at the area designated for "User A" in the ShopTogether™ component implemented on the web page that "User B" is viewing.
14. "User B" can then click on the thumbnail corresponding to "User A's" product and be redirected to that product page on the retailer's web site.
15. "User B" can then navigate to a different product page on the retailer's web site, but still see what product "User A" is viewing.
16. "User A", on a different product page than "User B", is able to see what product "User B" is viewing.
17. "User A" can float his/her mouse pointer over the thumbnail corresponding to "User B's" product in order to view a larger image of that product. Likewise, "User B" can float his/her mouse pointer over the thumbnail corresponding to "User A's" product in order to view a larger image of that product.
18. "User A" can drag and drop his/her product to the Shared Favorites area in the ShopTogether™ component in order to add it to their Shared Favorites list.
19. "User B" can then see that "User A" has added the product to their Shared Favorites list.
20. "User B" can then drag and drop his/her product to the Shared Favorites area in the ShopTogether™ component in order to add it to their Shared Favorites list.
21. "User A" can then see that "User B" has added the product to their Shared Favorites list.
22. "User A" can drag and drop his/her product to "User B's" area in the ShopTogether™ component in order to redirect "User B" to the product page on the retailer's web site corresponding to that product.
23. "User B" will then be notified that "User A" is trying to redirect "User B" to another product page and "User B" will be prompted to "Accept", "Decline" or "Accept Always".
24. "User A" will then wait for "User B's" response to the attempted product page redirection.
25. "User B" will then accept the proposed redirection.
26. "User A" will then be able to see that "User B" has accepted the product page redirection and that "User B" has been redirected to and is currently viewing the intended product page.
27. "User B" can then click on the thumbnail of a product in the Shared Favorites area and be redirected to the product page on the retailer's web site corresponding to that product.
28. "User A" can then click the "Open Chat" link in order to send a chat-style message to "User B".
29. The ShopTogether™ component then opens in an expanded Chat Mode, and "User A" sends a chat-style message to "User B".
30. "User B" is then notified that "User A" is sending "User B" a chat-style message and is prompted to enter Chat Mode in ShopTogether™.
31. "User B" enters Chat Mode and is able to see the message from "User A".
32. "User B" can then respond to the message from "User A" with a chat-style message from "User B to "User A".
33. "User A" is able to see the response from "User B".
34. "User A" can drag and drop a product thumbnail to the Chat area in the ShopTogether™ component in order to automatically generate and send to "User B" a chat-style message that includes a link to the product page on the retailer's web site that corresponds to that product. The generated link in the chat-style message can display the product name instead of the product page URL. The generated link might also display the product image, price and/or other product information.

35. "User B" is then able to see the message from "User A" containing the product link and "User B" can click the product name in the message and be redirected to the product page on the retailer's web site that corresponds to that product.
36. "User A" can click on the thumbnail of a product in the Shared Favorites area and be redirected to the product page on the retailer's web site corresponding to that product.
37. "User A" can also click on a link outside of the ShopTogether™ component on the web page and be redirected to the product page on the retailer's web site corresponding to that link.
38. "User B" can see that "User A" is now viewing a different product page.

At any point, "User A" and/or "User B" can click on an "Add to Shopping Cart" or similar link in order to purchase a product that he/she is viewing.

Figure 6:
FIG. 6 is an exemplary illustration of an exemplary user interface.

FIG. 6 is an exemplary illustration of "User A" visiting a retailer's web site on which ShopTogether™ has been implemented that contains a link to initiate the ShopTogether™ component using a web browser application on "User A's" computer.

Figure 7:
FIG. 7 is an exemplary illustration of an exemplary user interface.

FIG. 7 is an exemplary illustration of the ShopTogether™ component open in the webpage header and "User A" being prompted to enter his/her name and then click the "Next" button. The ShopTogether™ component is outlined with a dotted red box and the rest of the image represents the actual retailer's web page, other than the watermark indicating which user's screen is being shown.

Figure 8:
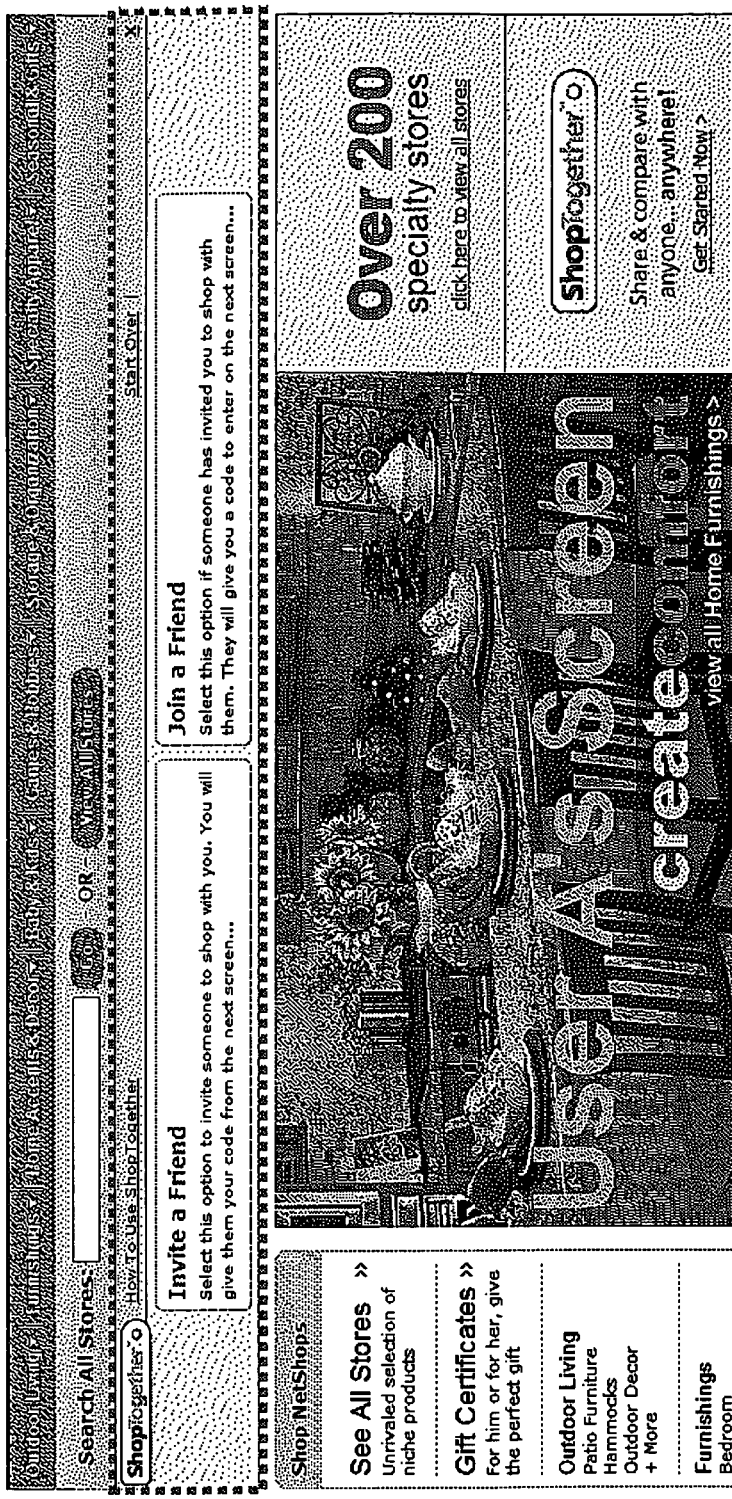
FIG. 8 is an exemplary illustration of an exemplary user interface.

FIG. 8 is an exemplary illustration of "User A" being prompted to select "Invite a Friend" or "Join a Friend". The ShopTogether™ component is outlined with a dotted red box and the rest of the image represents the actual retailer's web page, other than the watermark indicating which user's screen is being shown.

Figure 9:
FIG. 9 is an exemplary illustration of an exemplary user interface.

FIG. 9 is an exemplary illustration of "User A", having selected "Invite a Friend", being prompted with the instructions to "Call or email your friend and have them visit this site. They should select Join a Friend in ShopTogether™ and enter this code" and on the same screen "User A" being presented with a ShopTogether™ code to give to "User B". The ShopTogether™ component is outlined with a dotted red box and the rest of the image represents the actual retailer's web page, other than the watermark indicating which user's screen is being shown.

Figure 10:
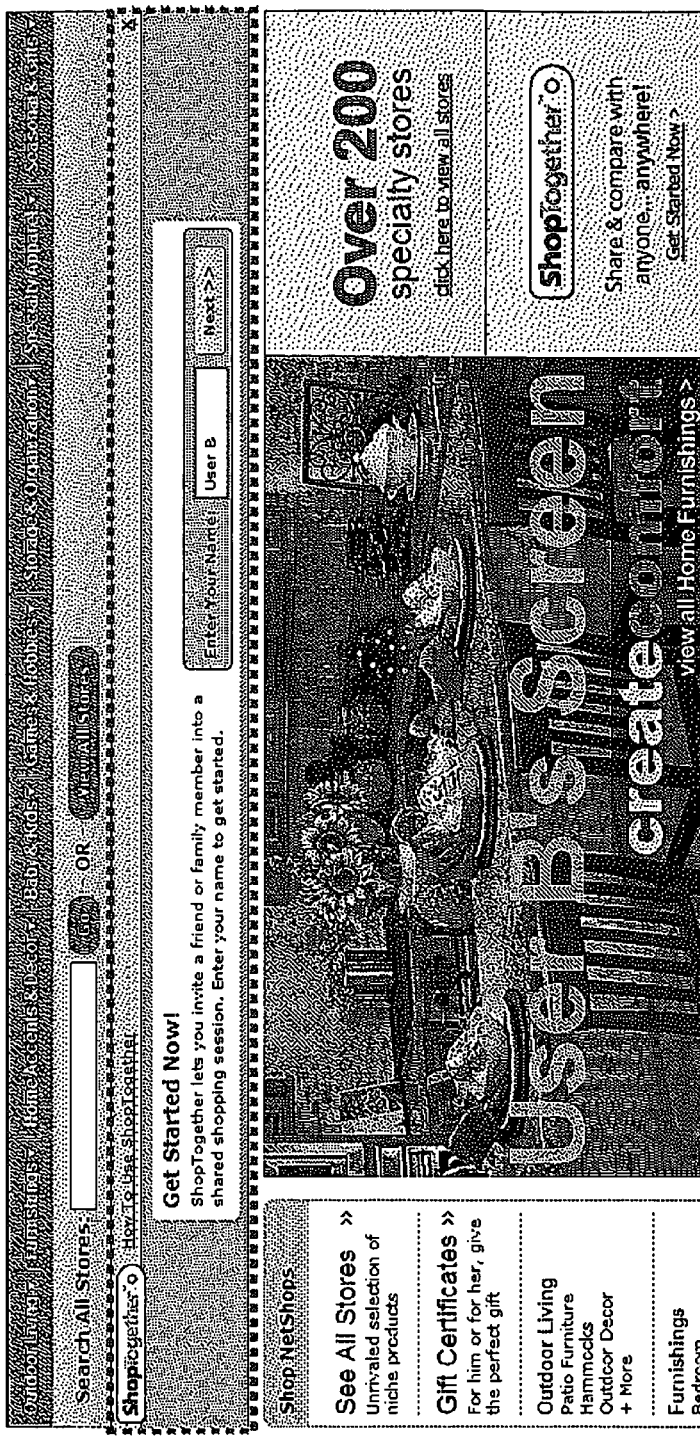
FIG. 10 is an exemplary illustration of an exemplary user interface.

FIG. 10 is an exemplary illustration of "User B" in a different location and communicating by telephone, email, chat, text message, instance message or similar method with "User A", after having visited the retailer's web site using a web browser application on "User B's" computer and after having initiated the ShopTogether™ component, being prompted to enter his/her name and click "Next". The ShopTogether™ component is outlined with a dotted red box and the rest of the image represents the actual retailer's web page, other than the watermark indicating which user's screen is being shown.

Figure 11:
FIG. 11 is an exemplary illustration of an exemplary user interface.

FIG. 11 is an exemplary illustration of "User B" being prompted to select "Invite a Friend" or "Join" a Friend". The ShopTogether™ component is outlined with a dotted red box and the rest of the image represents the actual retailer's web page, other than the watermark indicating which user's screen is being shown.

Figure 12:
FIG. 12 is an exemplary illustration of an exemplary user interface.

FIG. 12 is an exemplary illustration of "User B", having selected "Join a Friend", entering the ShopTogether™ code provided by "User A" and then clicking "Next". The ShopTogether™ component is outlined with a dotted red box and the rest of the image represents the actual retailer's web page, other than the watermark indicating which user's screen is being shown.

Figure 13:
FIG. 13 is an exemplary illustration of an exemplary user interface.

FIG. 13 is an exemplary illustration of "User B" waiting for the connection to "User A" to be established through the ShopTogether™ server. The ShopTogether™ component is outlined with a dotted red box and the rest of the image represents the actual retailer's web page, other than the watermark indicating which user's screen is being shown.

Figure 14:
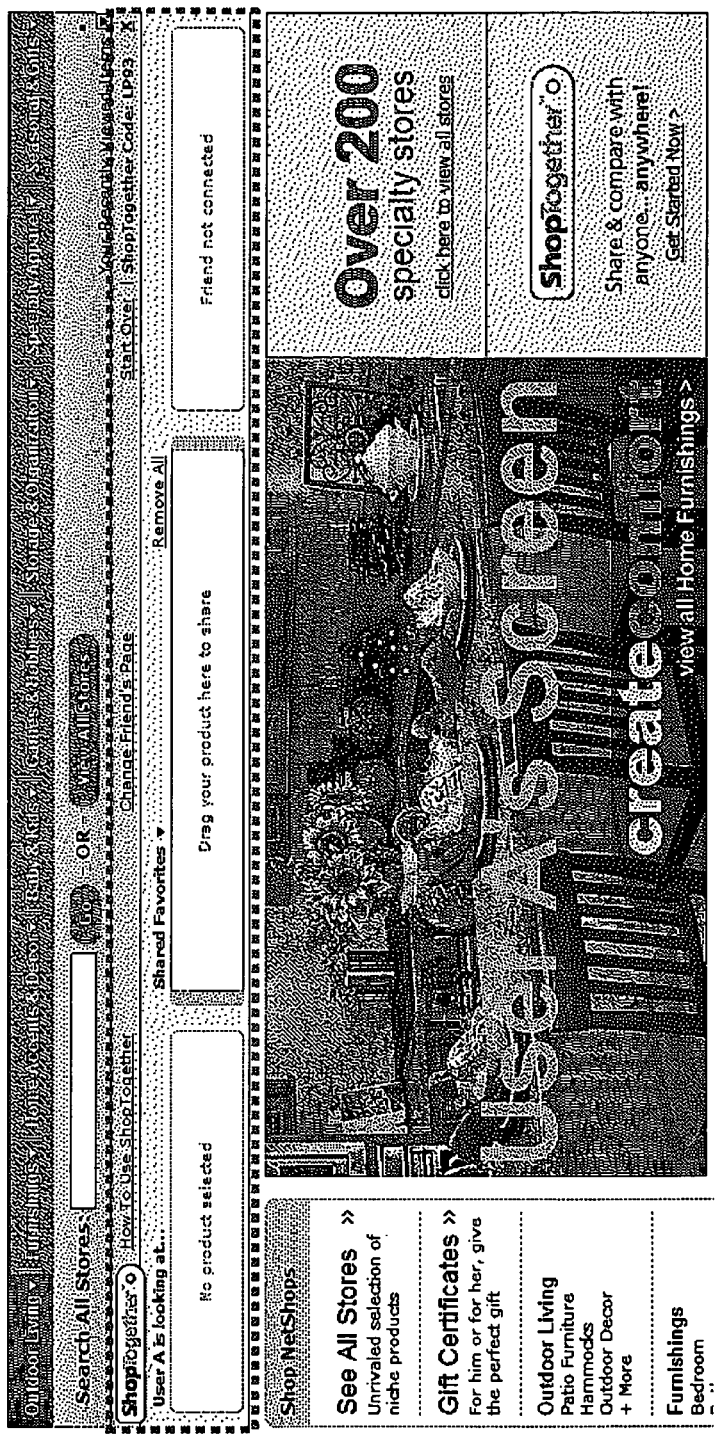
FIG. 14 is an exemplary illustration of an exemplary user interface.

FIG. 14 is an exemplary illustration of "User A" waiting for "User B" to connect, after having given "User B" the ShopTogether™ code. The ShopTogether™ component is outlined with a dotted red box and the rest of the image represents the actual retailer's web page, other than the watermark indicating which user's screen is being shown.

Figure 15:
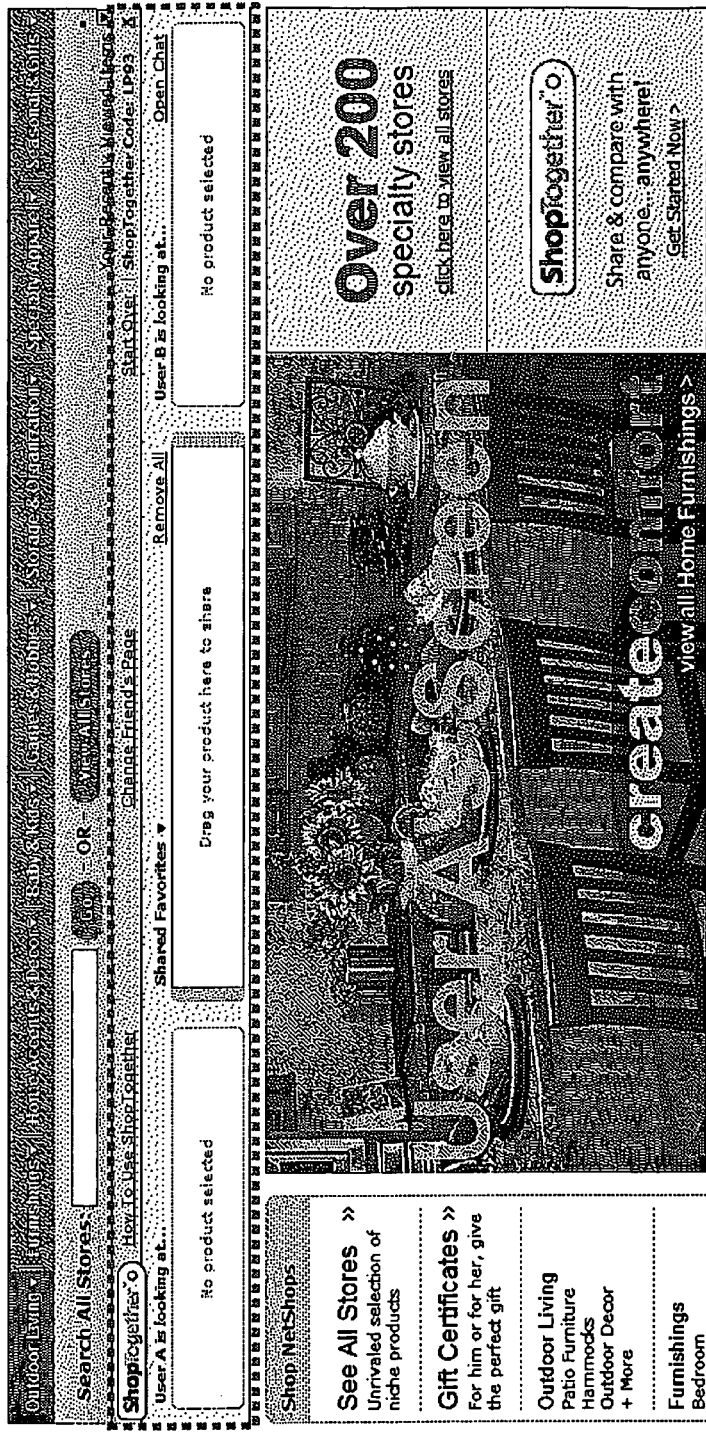
FIG. 15 is an exemplary illustration of an exemplary user interface.

FIG. 15 is an exemplary illustration of "User A" connected to "User B" with no products selected. The ShopTogether™ component is outlined with a dotted red box and the rest of the image represents the actual retailer's web page, other than the watermark indicating which user's screen is being shown.

Figure 16:
FIG. 16 is an exemplary illustration of an exemplary user interface.

FIG. 16 is an exemplary illustration of "User A" navigating to a product page on the retailer's web site. The ShopTogether™ component is outlined with a dotted red box and the rest of the image represents the actual retailer's web page, other than the watermark indicating which user's screen is being shown.

Figure 17:
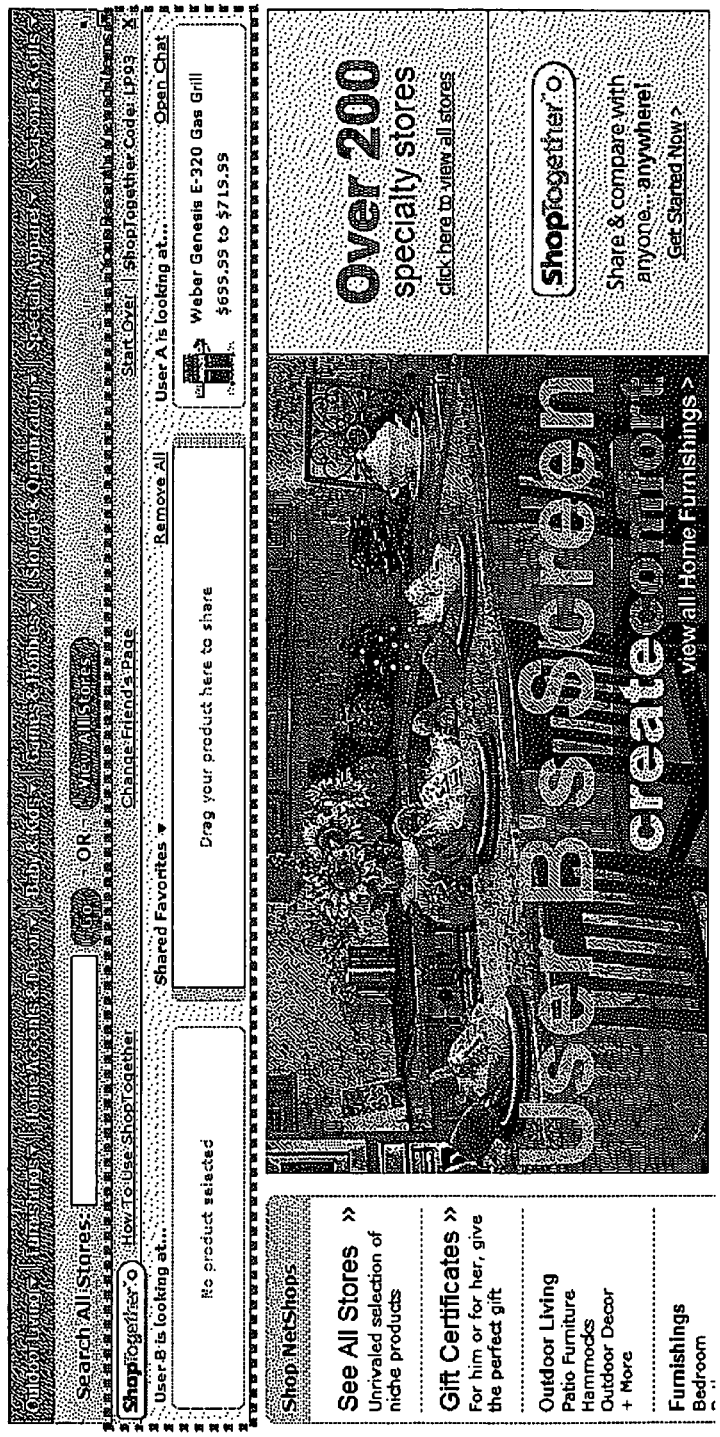
FIG. 17 is an exemplary illustration of an exemplary user interface.

FIG. 17 is an exemplary illustration of "User B" being able to see which product "User A" is currently viewing. The ShopTogether™ component is outlined with a dotted red box and the rest of the image represents the actual retailer's web page, other than the watermark indicating which user's screen is being shown.

Figure 18:
FIG. 18 is an exemplary illustration of an exemplary user interface.

FIG. 18 is an exemplary illustration of "User B" clicking on the thumbnail corresponding to "User A's" product and being redirected to that product page on the retailer's web site. The ShopTogether™ component is outlined with a dotted red box and the rest of the image represents the actual retailer's web page, other than the watermark indicating which user's screen is being shown.

Figure 19:
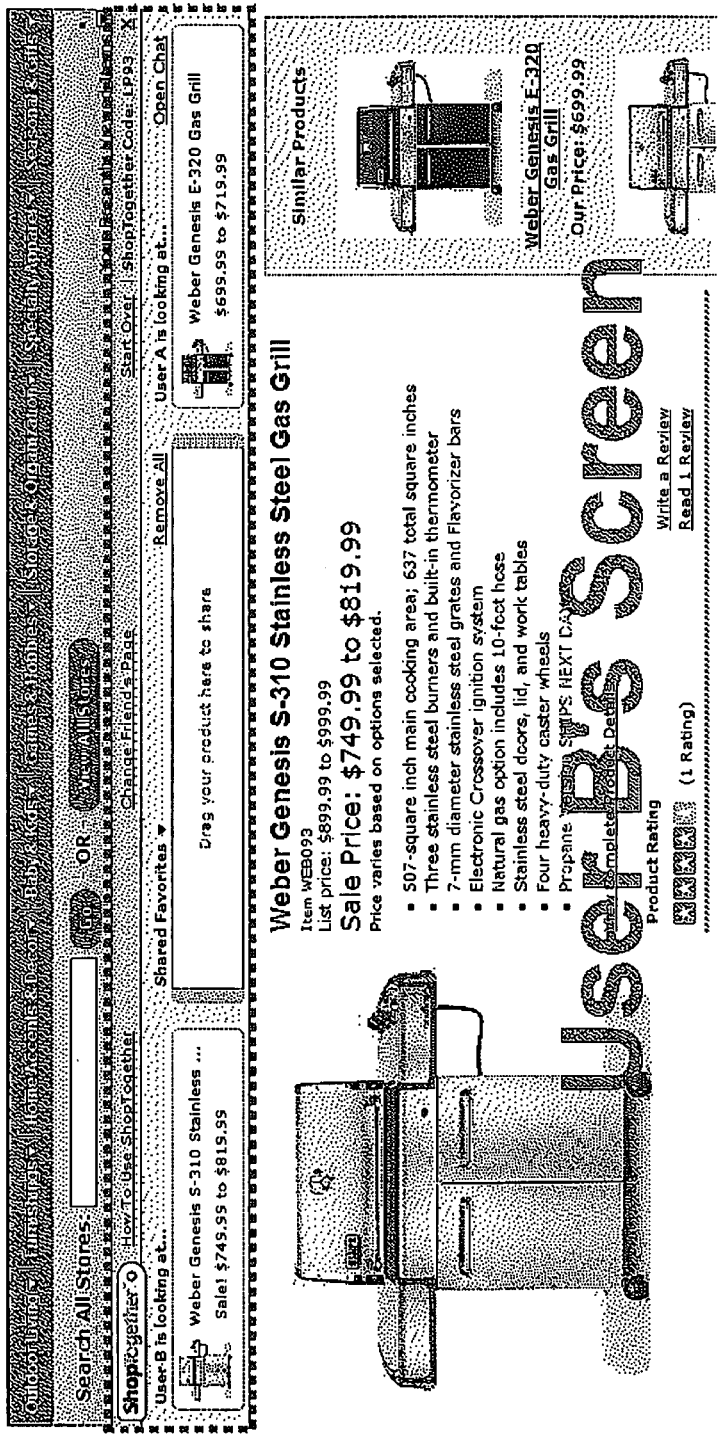
FIG. 19 is an exemplary illustration of an exemplary user interface.

FIG. 19 is an exemplary illustration of "User B" then navigating to a different product page on the retailer's web site, but still able to see what product "User A" is viewing. The ShopTogether™ component is outlined with a dotted red box and the rest of the image represents the actual retailer's web page, other than the watermark indicating which user's screen is being shown.

Figure 20:
FIG. 20 is an exemplary illustration of an exemplary user interface.

FIG. 20 is an exemplary illustration of "User A", on a different product page than "User B", being able to see what product "User B" is viewing. The ShopTogether™ component is outlined with a dotted red box and the rest of the image represents the actual retailer's web page, other than the watermark indicating which user's screen is being shown.

Figure 21:
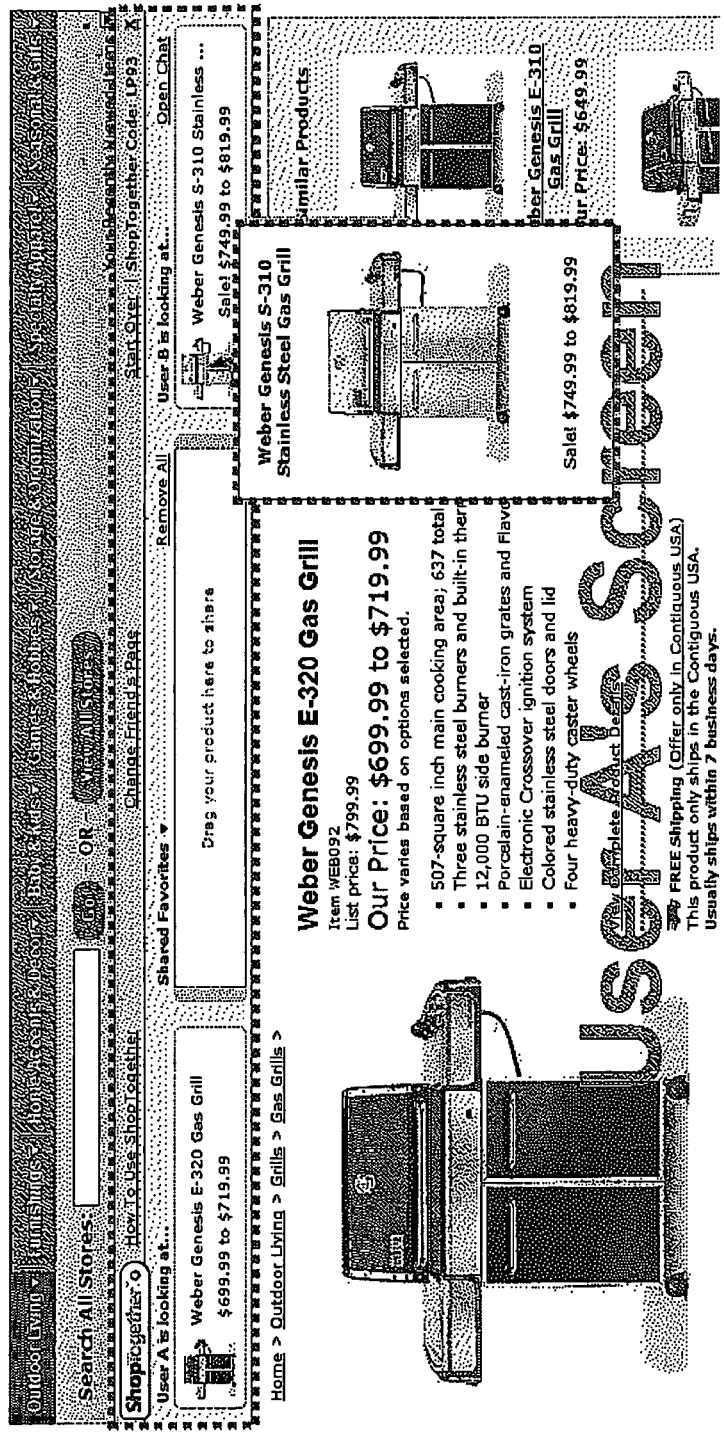
FIG. 21 is an exemplary illustration of an exemplary user interface.

FIG. 21 is an exemplary illustration of "User A" floating his/her mouse pointer over the thumbnail corresponding to "User B's" product in order to view a larger image of that product. The ShopTogether™ component is outlined with a dotted red box and the rest of the image represents the actual retailer's web page, other than the watermark indicating which user's screen is being shown.

Figure 22:
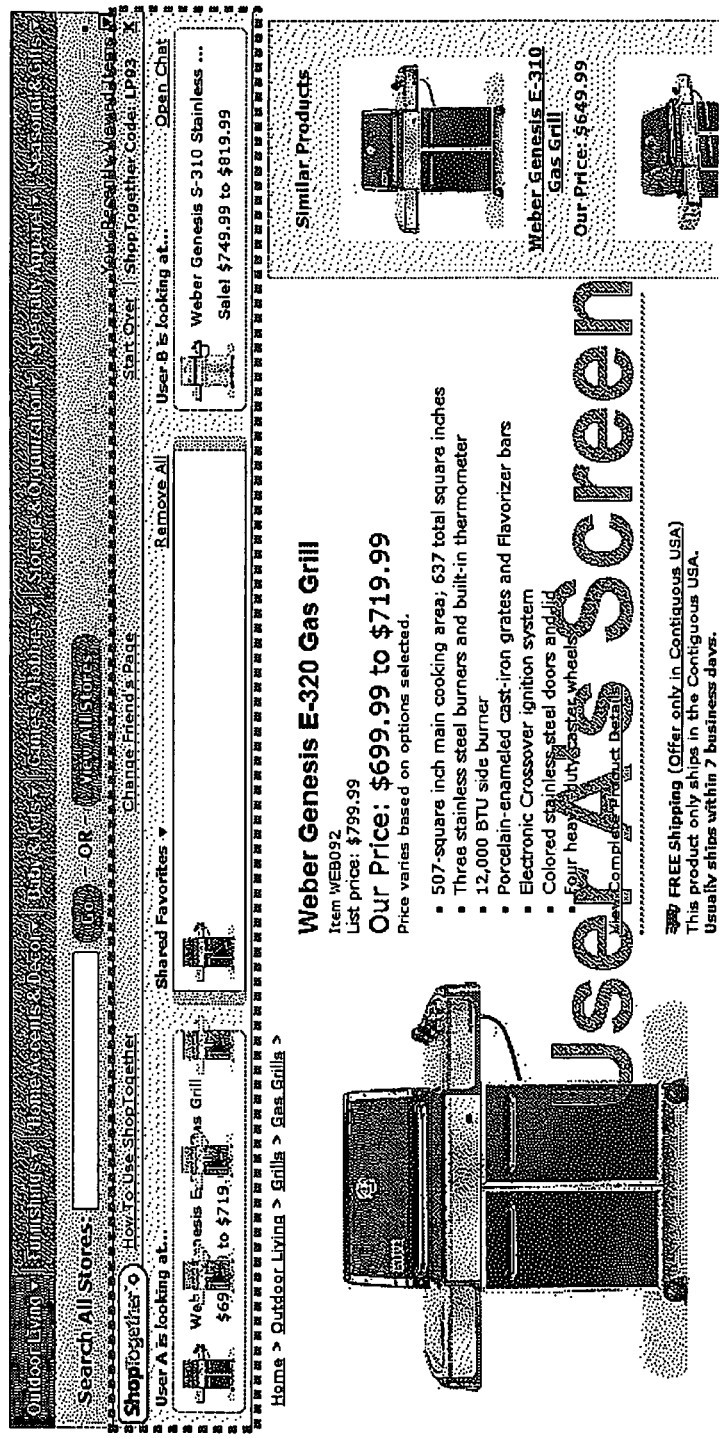
FIG. 22 is an exemplary illustration of an exemplary user interface.

FIG. 22 is an exemplary illustration of "User A" dragging and dropping his/her product to the Shared Favorites area in order to add it to their Shared Favorites list. The ShopTogether™ component is outlined with a dotted red box and the rest of the image represents the actual retailer's web page, other than the watermark indicating which user's screen is being shown.

Figure 23:
FIG. 23 is an exemplary illustration of an exemplary user interface.

FIG. 23 is an exemplary illustration of "User B" being able to see that "User A" has added the product to their Shared Favorites list. The ShopTogether™ component is outlined with a dotted red box and the rest of the image represents the actual retailer's web page, other than the watermark indicating which user's screen is being shown.

Figure 24:
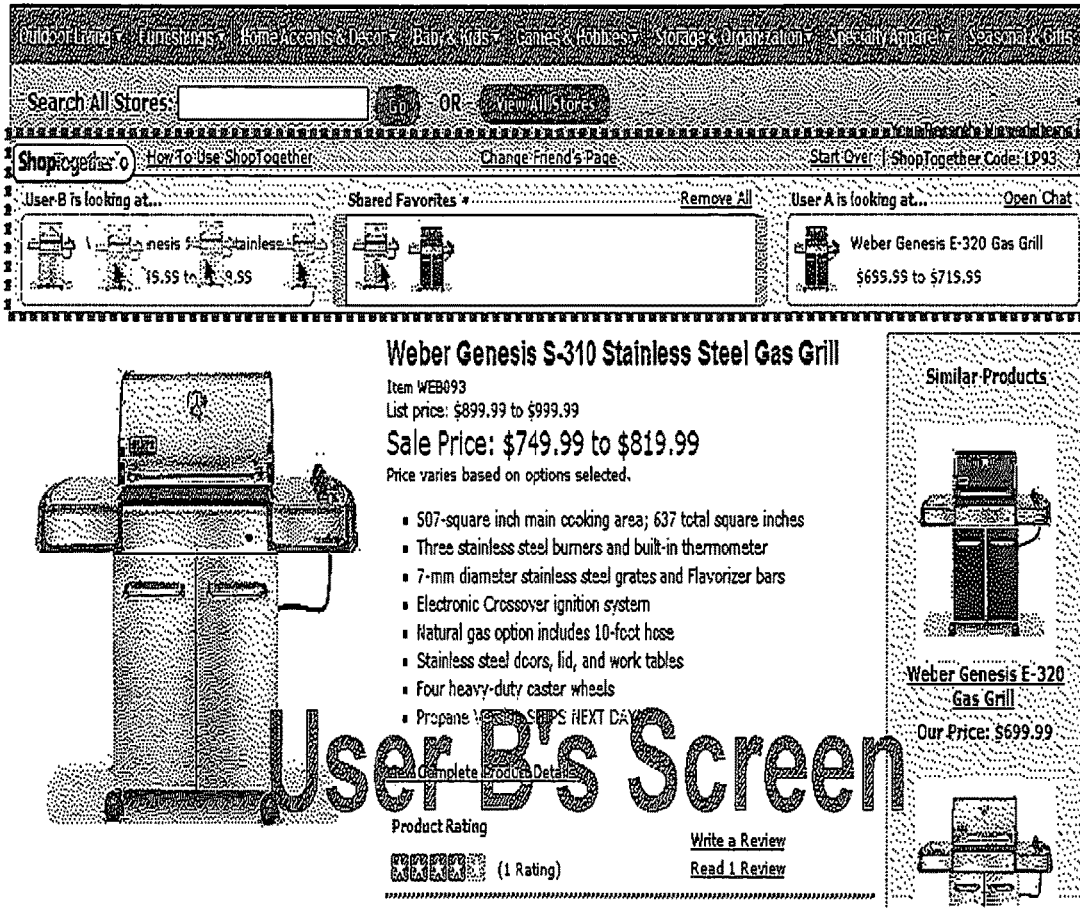
FIG. 24 is an exemplary illustration of an exemplary user interface.

FIG. 24 is an exemplary illustration of "User B" dragging and dropping his/her product to the Shared Favorites area in order to add it to their Shared Favorites list. The ShopTogether™ component is outlined with a dotted red box and the rest of the image represents the actual retailer's web page, other than the watermark indicating which user's screen is being shown.

Figure 25:
FIG. 25 is an exemplary illustration of an exemplary user interface.

FIG. 25 is an exemplary illustration of "User A" being able to see that "User B" has added a product to their Shared Favorites list. The ShopTogether™ component is outlined with a dotted red box and the rest of the image represents the actual retailer's web page, other than the watermark indicating which user's screen is being shown.

Figure 26:
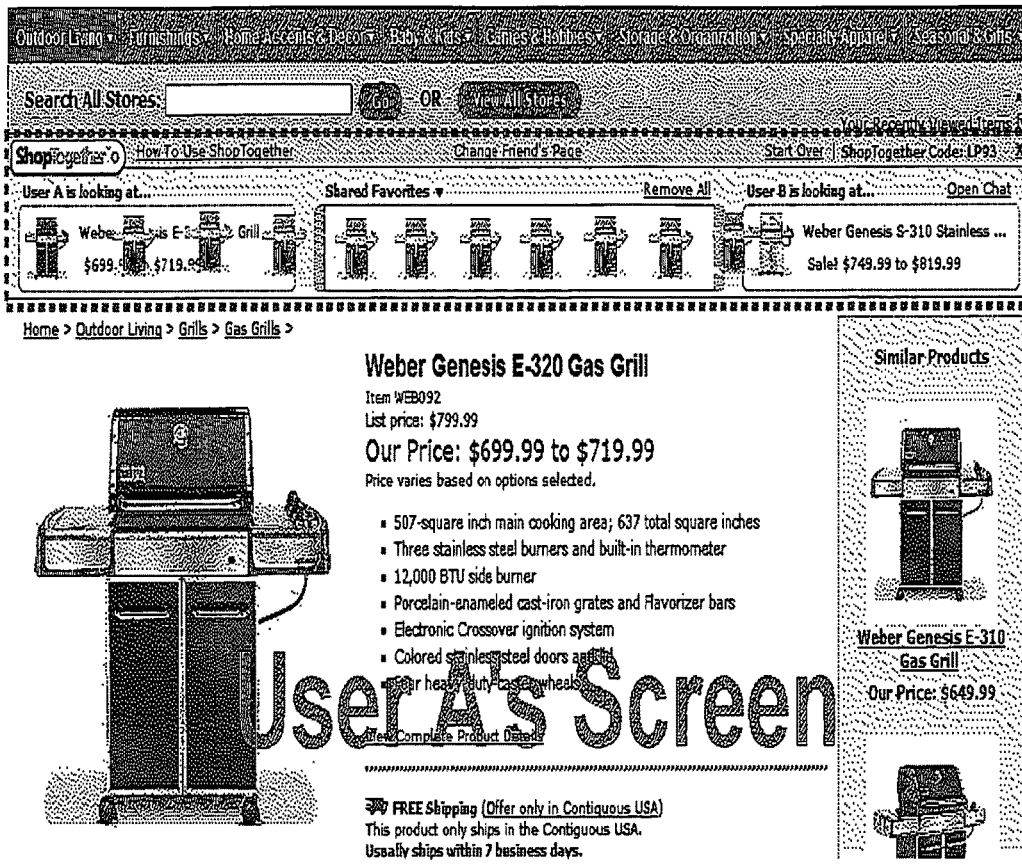
FIG. 26 is an exemplary illustration of an exemplary user interface.

FIG. 26 is an exemplary illustration of "User A" dragging and dropping his/her product to "User B's" area in the ShopTogether™ component in order to redirect "User B" to the product page on the retailer's web site corresponding to that product. The ShopTogether™ component is outlined with a dotted red box and the rest of the image represents the actual retailer's web page, other than the watermark indicating which user's screen is being shown.

Figure 27:
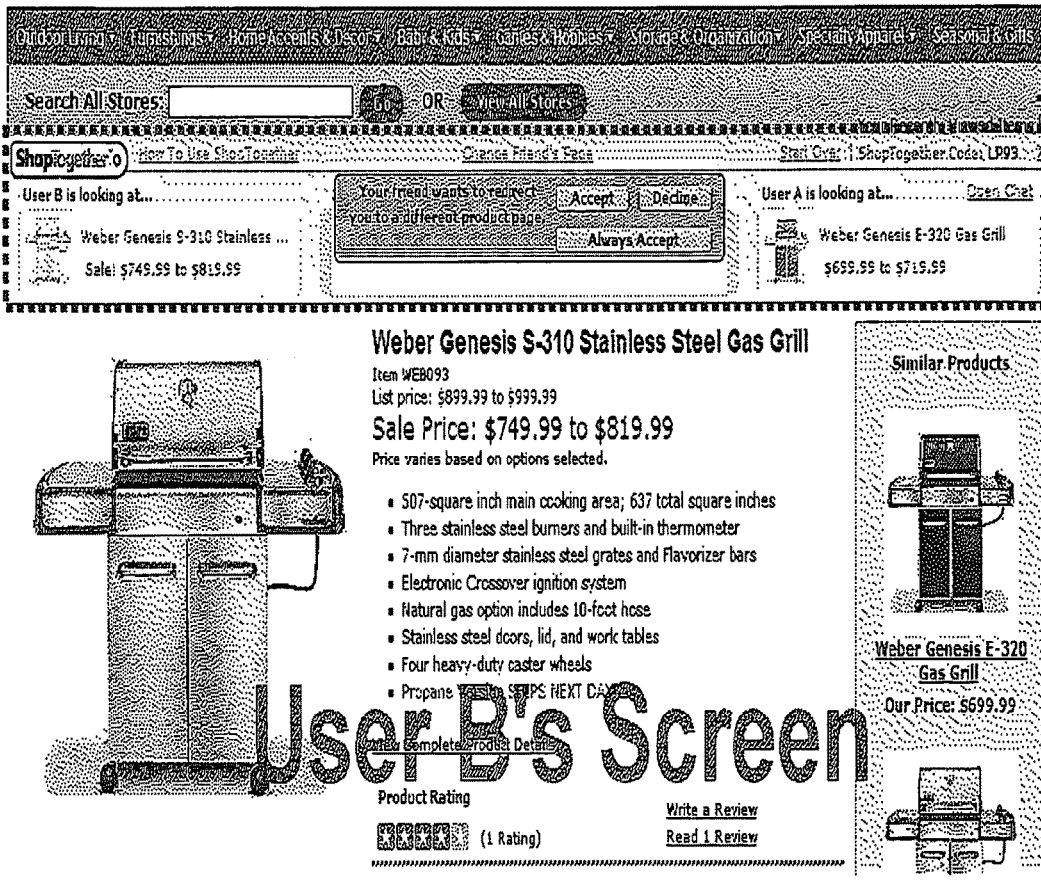
FIG. 27 is an exemplary illustration of an exemplary user interface.

FIG. 27 is an exemplary illustration of "User B" being notified that "User A" is trying to redirect "User B" to another product page and "User B" being prompted to "Accept", "Decline" or "Accept Always". The ShopTogether™ component is outlined with a dotted red box and the rest of the image represents the actual retailer's web page, other than the watermark indicating which user's screen is being shown.

Figure 28:
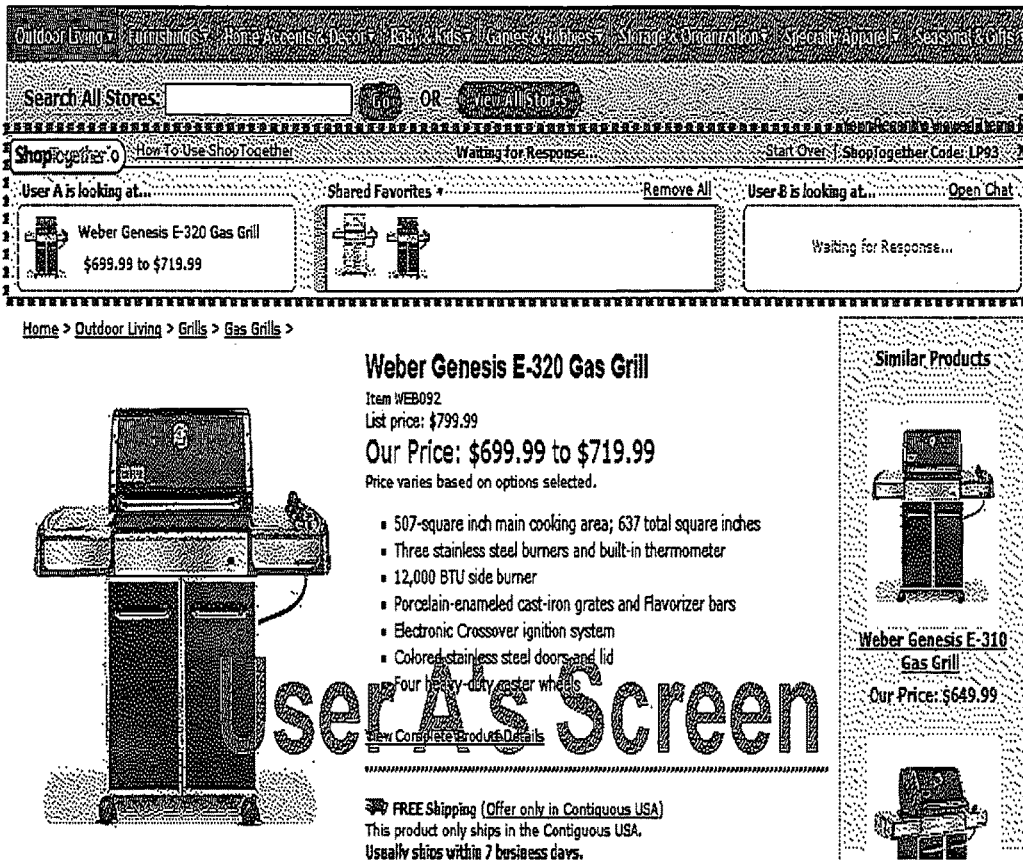
FIG. 28 is an exemplary illustration of an exemplary user interface.

FIG. 28 is an exemplary illustration of "User A" waiting for "User B's" response to the attempted product page redirection. The ShopTogether™ component is outlined with a dotted red box and the rest of the image represents the actual retailer's web page, other than the watermark indicating which user's screen is being shown.

Figure 29:
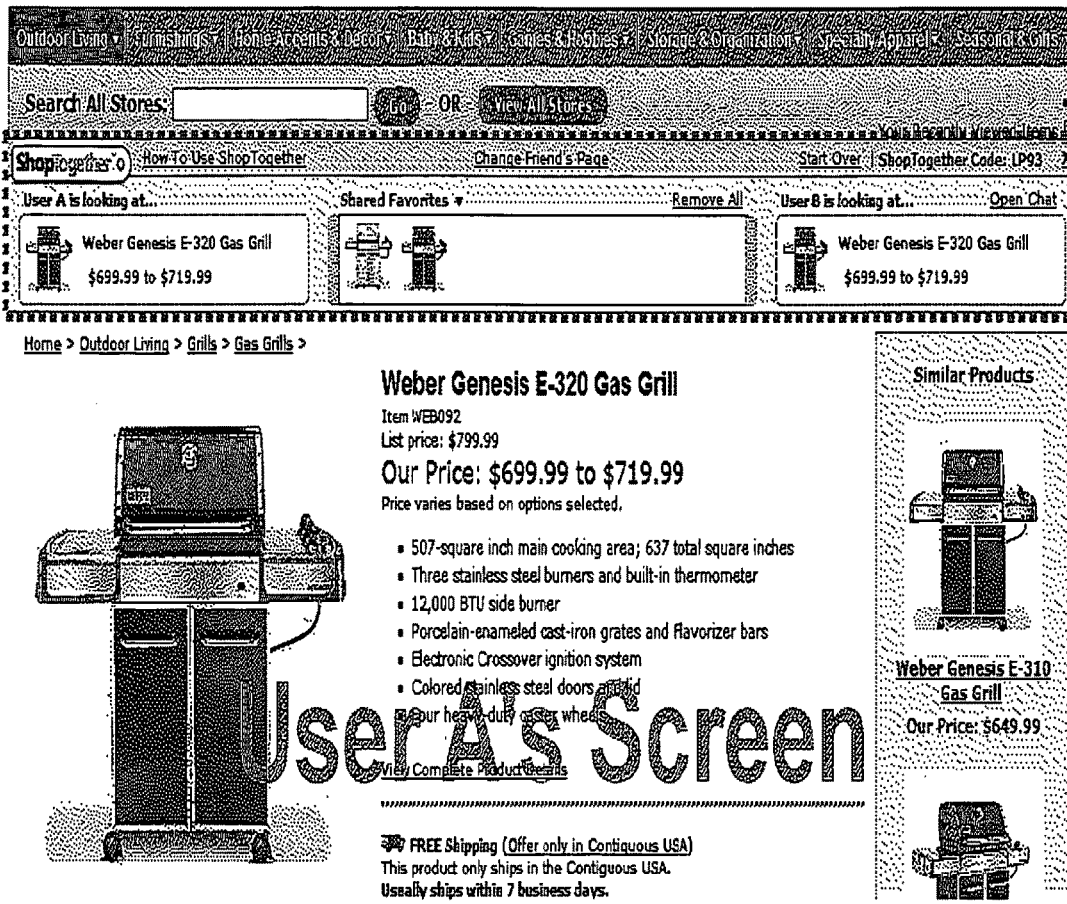
FIG. 29 is an exemplary illustration of an exemplary user interface.

FIG. 29 is an exemplary illustration of "User A" being able to see that "User B" has accepted the product page redirection and that "User B" has been redirected to and is currently viewing the intended product page. The ShopTogether™ component is outlined with a dotted red box and the rest of the image represents the actual retailer's web page, other than the watermark indicating which user's screen is being shown.

Figure 30:
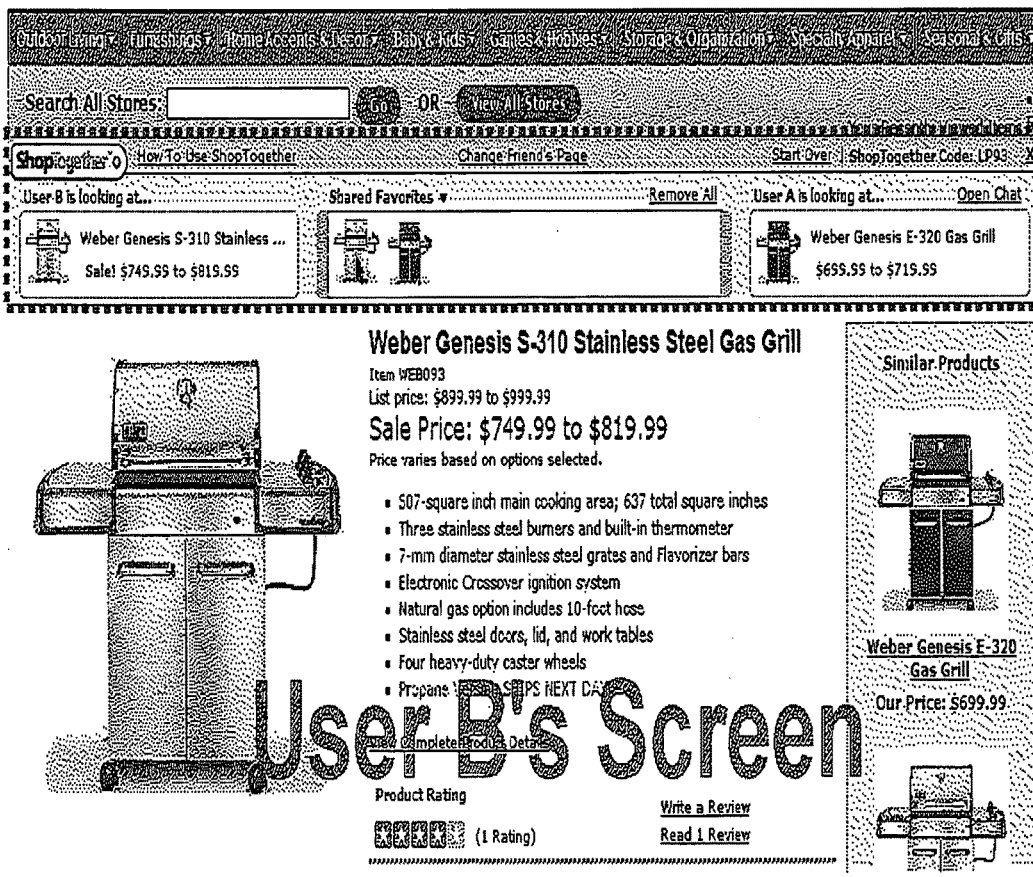
FIG. 30 is an exemplary illustration of an exemplary user interface.

FIG. 30 is an exemplary illustration of "User B" clicking on the thumbnail of a product in the Shared Favorites area and being redirected to the product page on the retailer's web site corresponding to that product. The ShopTogether™ component is outlined with a dotted red box and the rest of the image represents the actual retailer's web page, other than the watermark indicating which user's screen is being shown.

Figure 31:
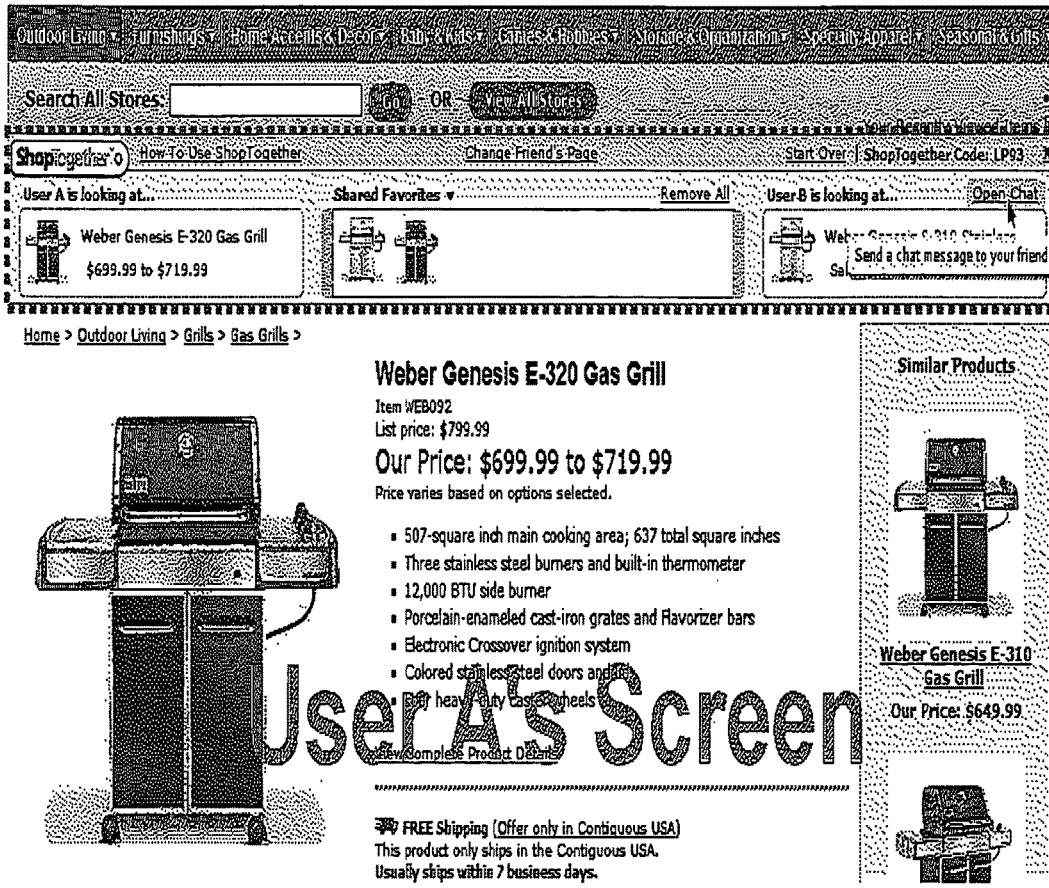
FIG. 31 is an exemplary illustration of an exemplary user interface.

FIG. 31 is an exemplary illustration of "User A" clicking the "Open Chat" link in order to send a chat-style message to "User B". The ShopTogether™ component is outlined with a dotted red box and the rest of the image represents the actual retailer's web page, other than the watermark indicating which user's screen is being shown.

Figure 32:
FIG. 32 is an exemplary illustration of an exemplary user interface.

FIG. 32 is an exemplary illustration of the ShopTogether™ component in the expanded Chat Mode, with "User A" sending a chat-style message to "User B". The ShopTogether™ component is outlined with a dotted red box and the rest of the image represents the actual retailer's web page, other than the watermark indicating which user's screen is being shown.

Figure 33:
FIG. 33 is an exemplary illustration of an exemplary user interface.

FIG. 33 is an exemplary illustration of "User B" being notified that "User A" is sending "User B" a chat-style message and being prompted to enter Chat Mode in ShopTogether™. The ShopTogether™ component is outlined with a dotted red box and the rest of the image represents the actual retailer's web page, other than the watermark indicating which user's screen is being shown.

Figure 34:
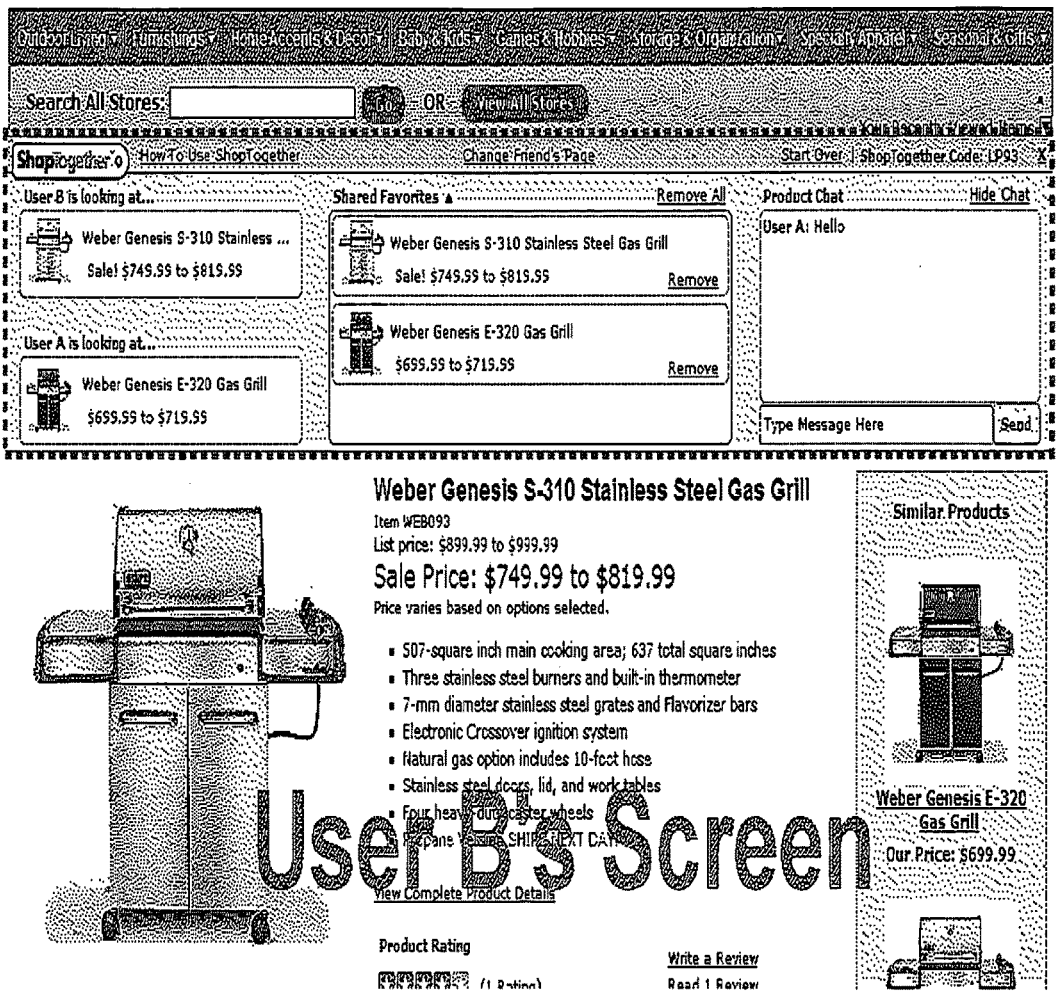
FIG. 34 is an exemplary illustration of an exemplary user interface.

FIG. 34 is an exemplary illustration of "User B" having entered Chat Mode and being able to see the message from "User A". The ShopTogether™ component is outlined with a dotted red box and the rest of the image represents the actual retailer's web page, other than the watermark indicating which user's screen is being shown.

Figure 35:
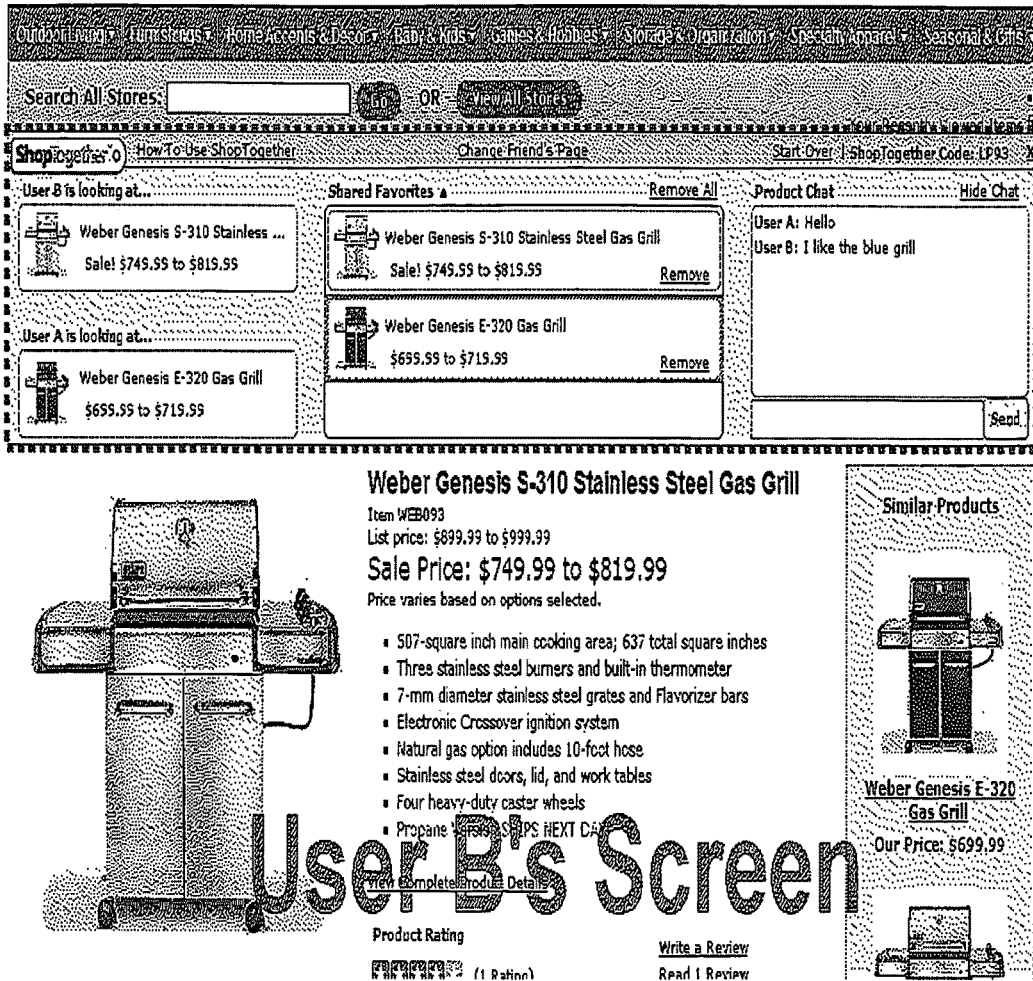
FIG. 35 is an exemplary illustration of an exemplary user interface.

FIG. 35 is an exemplary illustration of "User B" responding to the message from "User A" with a chat-style message from "User B to "User A". The ShopTogether™ component is outlined with a dotted red box and the rest of the image represents the actual retailer's web page, other than the watermark indicating which user's screen is being shown.

Figure 36:
FIG. 36 is an exemplary illustration of an exemplary user interface.

FIG. 36 is an exemplary illustration of "User A" being able to see the response from "User B" and of "User A" dragging and dropping a product thumbnail to the Chat area in the ShopTogether™ component in order to automatically generate and send to "User B" a chat-style message that includes a link to the product page on the retailer's web site that corresponds to that product with the generated link displaying the product name. The ShopTogether™ component is outlined with a dotted red box and the rest of the image represents the actual retailer's web page, other than the watermark indicating which user's screen is being shown.

Figure 37:
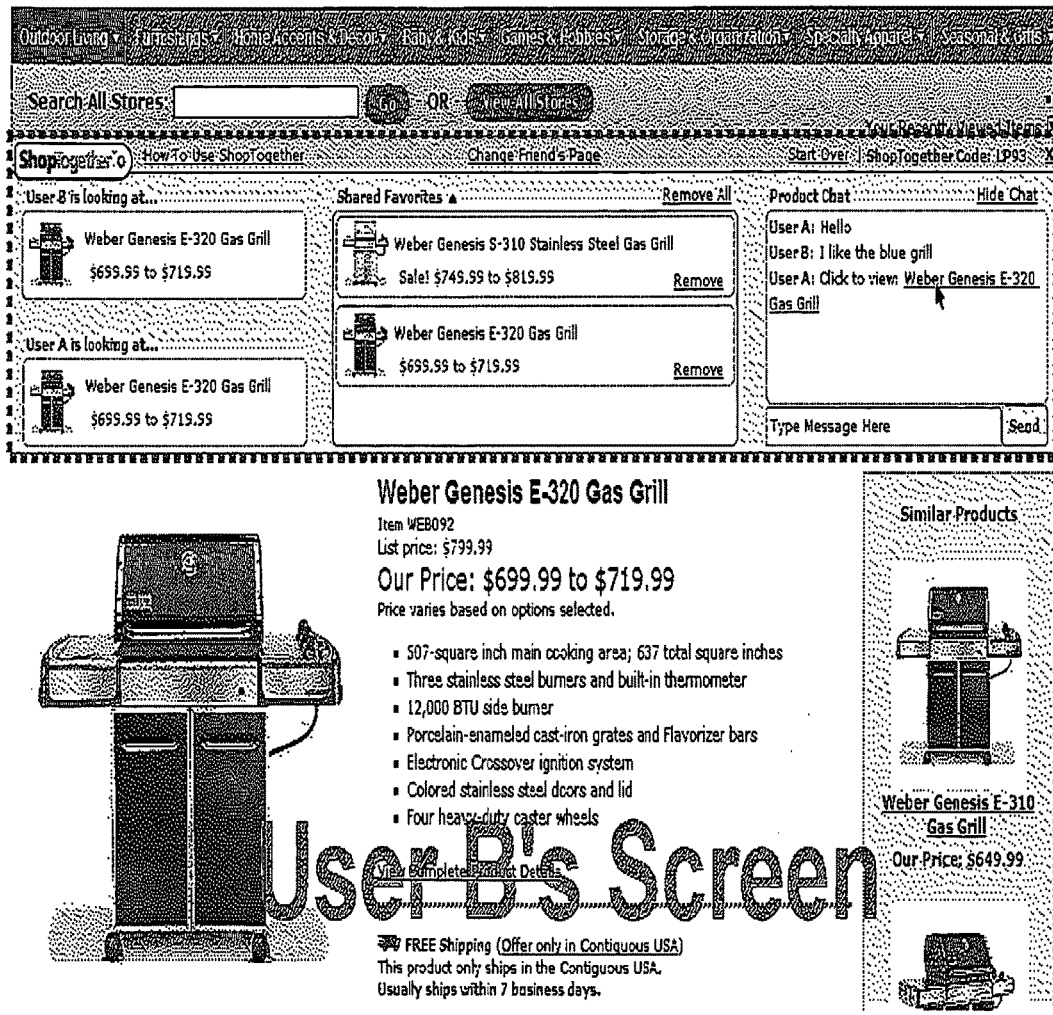
FIG. 37 is an exemplary illustration of an exemplary user interface.

FIG. 37 is an exemplary illustration of "User B" being able to see the message from "User A" containing the product link and "User B" clicking the product name in the message and being redirected to the product page on the retailer's web site that corresponds to that product. The ShopTogether™ component is outlined with a dotted red box and the rest of the image represents the actual retailer's web page, other than the watermark indicating which user's screen is being shown.

Figure 38:
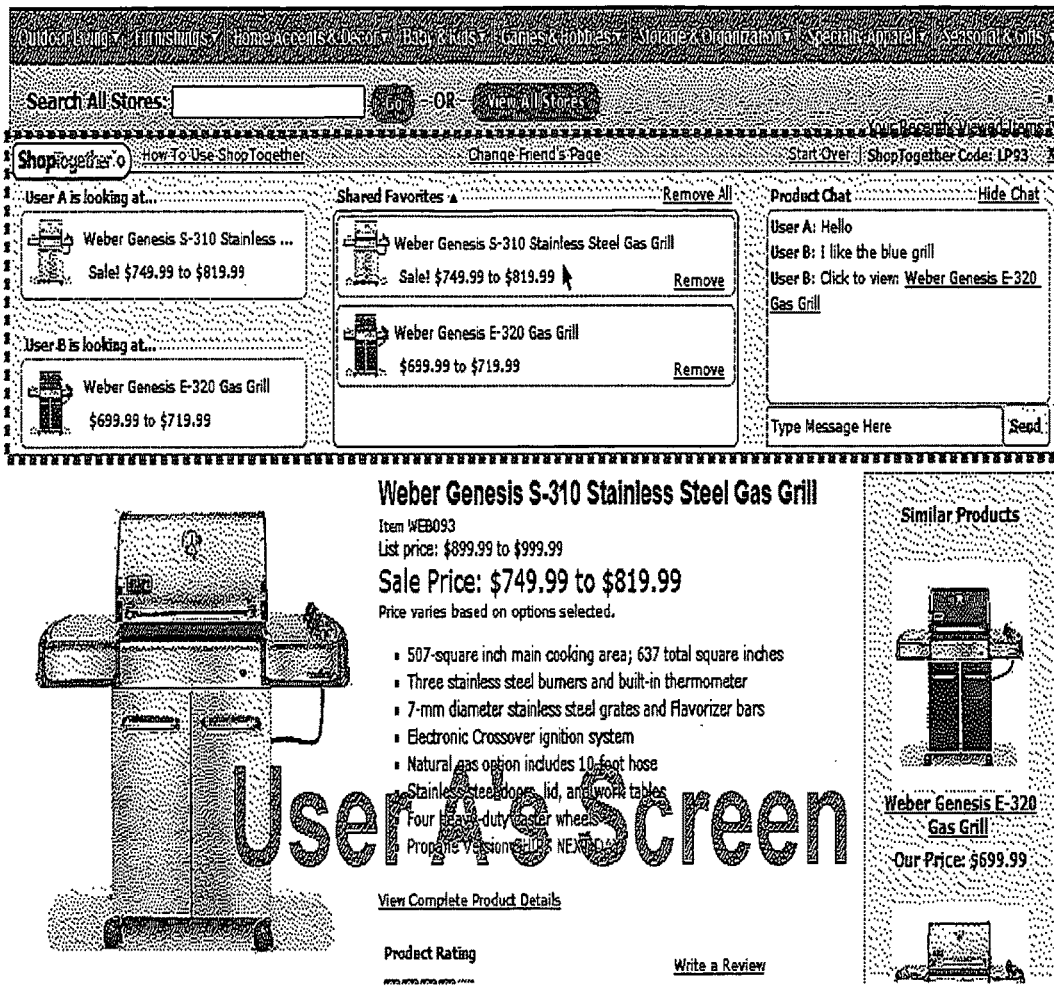
FIG. 38 is an exemplary illustration of an exemplary user interface.

FIG. 38 is an exemplary illustration of "User A" clicking on the thumbnail of a product in the Shared Favorites area and being redirected to the product page on the retailer's web site corresponding to that product. The ShopTogether™ component is outlined with a dotted red box and the rest of the image represents the actual retailer's web page, other than the watermark indicating which user's screen is being shown.

Figure 39:
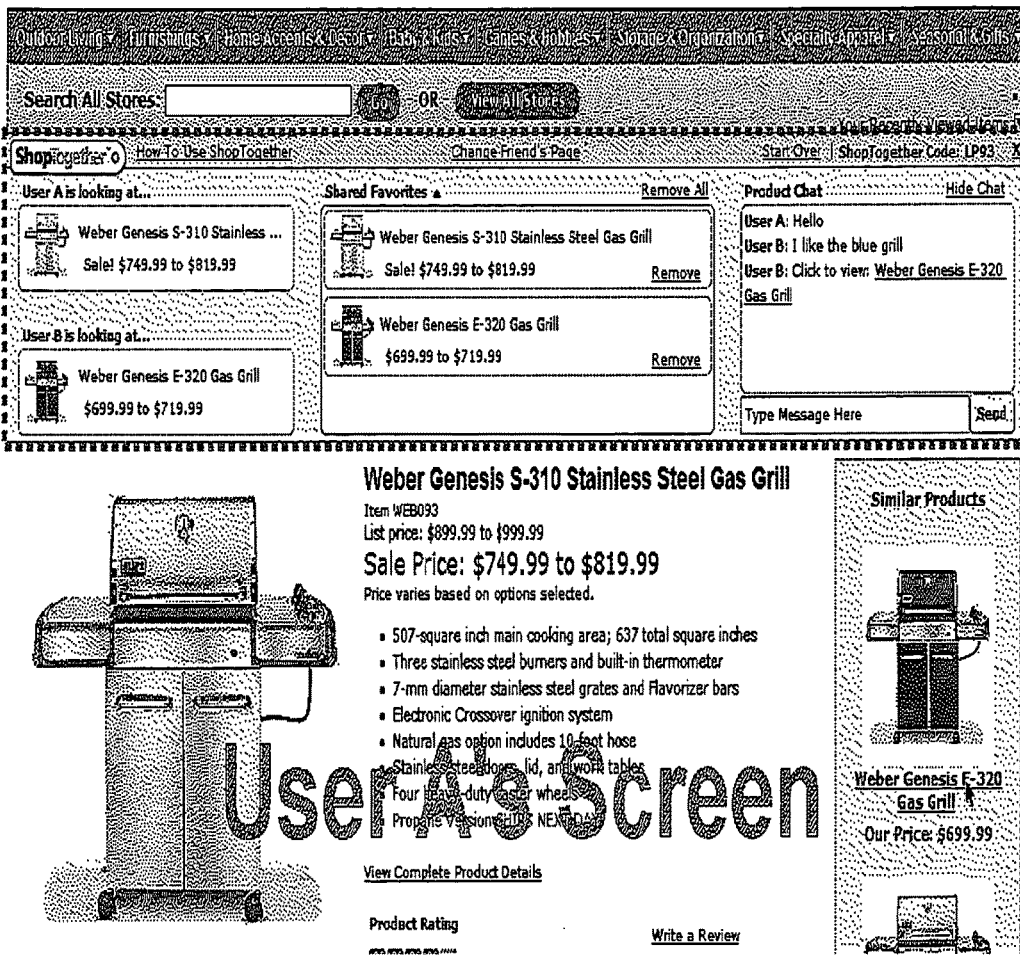
FIG. 39 is an exemplary illustration of an exemplary user interface.

FIG. 39 is an exemplary illustration of "User A" clicking on a link outside of the ShopTogether™ component on the web page. The ShopTogether™ component is outlined with a dotted red box and the rest of the image represents the actual retailer's web page, other than the watermark indicating which user's screen is being shown.

Figure 40:
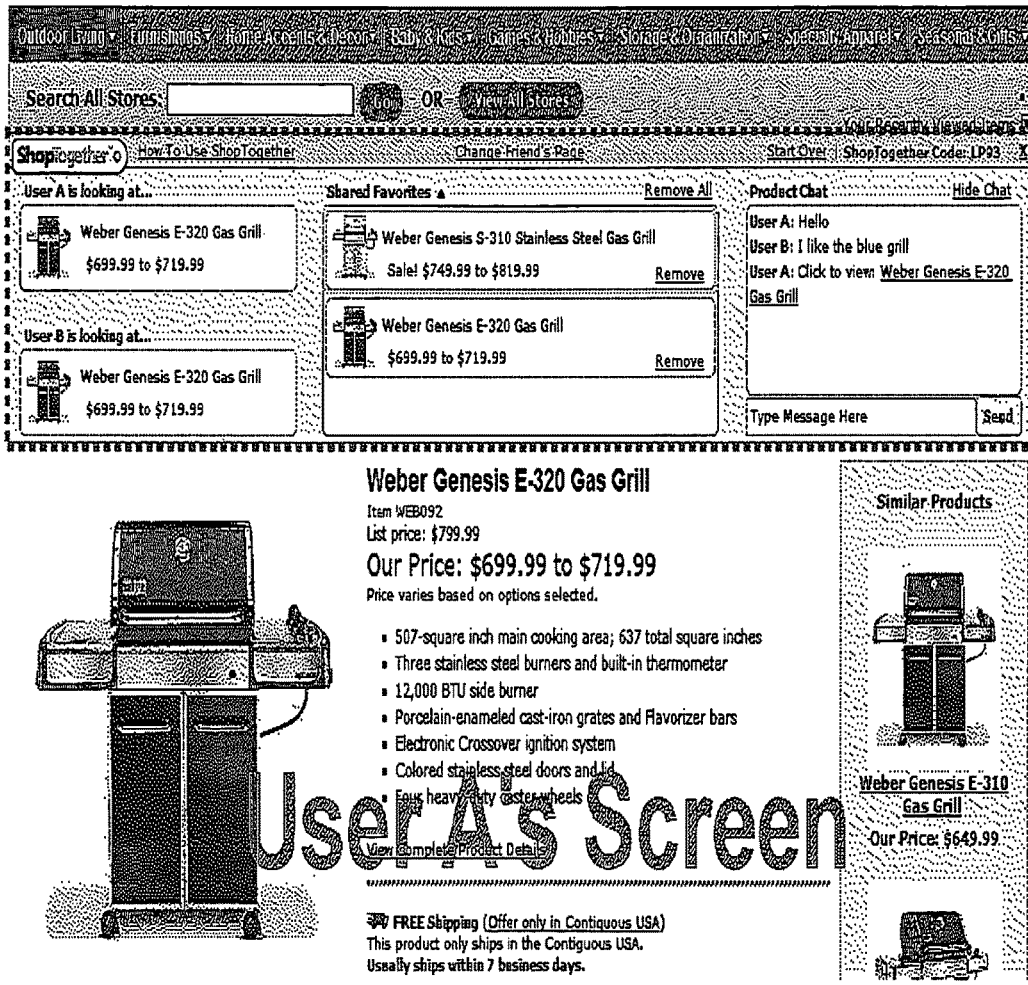
FIG. 40 is an exemplary illustration of an exemplary user interface.

FIG. 40 is an exemplary illustration of "User A" having clicked on a link on the web page outside of the ShopTogether™ component and having been redirected to the product page on the retailer's web site corresponding to that link. The ShopTogether™ component is outlined with a dotted red box and the rest of the image represents the actual retailer's web page, other than the watermark indicating which user's screen is being shown.

Figure 41:
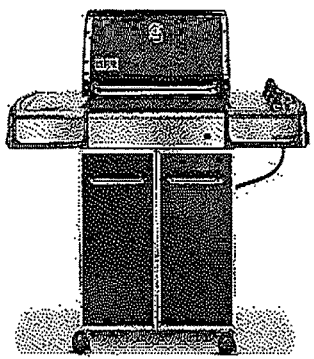
FIG. 41 is an exemplary illustration of an exemplary user interface.

FIG. 41 is an exemplary illustration of "User B" having clicked on the "Add to Shopping Cart" link on the web page outside of the ShopTogether™ component and in order to purchase the product that he/she is viewing. The ShopTogether™ component is outlined with a dotted red box and the rest of the image represents the actual retailer's web page, other than the watermark indicating which user's screen is being shown.

Scenario #2 (Multi-User Online Retail Customer Support). One exemplary embodiment called can allow a customer service representative to shop together with a consumer on a retail web site. A potential simplified process flow for this exemplary embodiment can comprise such activities as:

- The consumer and the customer service representative communicate by telephone and/or chat.
- The customer service representative invites the consumer to shop together on the retailer's web site from different locations.
- The User Interface component is initiated by both users and the customer service representative and the consumer connect in a shared real-time and/or near real-time session.
- Each user can see a representation of the product(s) that the other user is viewing on the web site.
- The customer service representative can add suggested products to a Shared Favorites list that the consumer can view.
- The consumer can look at one or more of the suggested products while the customer service representative looks for other products that might meet the consumer's needs.
- The customer service representative can see which product the consumer is viewing while the customer service representative is on another page on the web site.
- The consumer can look at other products on the site and the customer service representative can see which product the consumer is viewing while the customer service representative is on another page on the web site.
- The customer service representative and the consumer can discuss each other's product and/or shared products.
- The customer service representative can redirect the consumer to a product page on the web site.
- The consumer makes a selection and purchases a product.

Scenario #3 (Multi-User Online Shopping Across Multiple Retail Sites Among A List of Users). One exemplary embodiment can allow certain users to shop together in a shared real-time and/or near real-time session across multiple retailers' web sites. A potential simplified process flow for this exemplary embodiment can comprise such activities as:

- A user initiates the User Interface as a desktop application, component and/or widget and/or as a component embedded in a web site and/or web browser.
- Having established a list of potential users to shop together with, either by previous establishing relationships with other users of a web site and/or by using connections on a social networking and/or other similar site and/or by viewing currently active users on a web site and/or by inviting users to shop together and/or by otherwise establishing a list of potential users to shop together with, the user is able to see which users from his/her list of potential users is currently active.
- The active users can be connected in a shared real-time and/or near real-time session with the other active users.
- Each user can visit one or more retail web sites whose pages have been appropriately tagged and/or otherwise marked with content in a form that can be accessed by the User Interface.
- Each user can see which retail web site(s) the other user(s) are currently visiting and/or which product(s) the other user(s) are currently viewing.
- A user can redirect another user or users to a specific retail web site and/or product page on a retail web site.
- A user can add notes, ratings, reviews and/or other similar personal comments about a retailer web site and/or product. These comments can be viewed by other users.
- A user can chat with other users and can drag retailers and/or products to the chat interface to automatically send a message with the retailer name and/or logo and/or link and/or product name and/or image and/or link to other users.
- A user might be shown advertisements based on what the user is viewing or based on what retailers and/or products other users are viewing.
- When a user sees what retailers and/or products other users are viewing, those representations of other users' views might be considered advertisements for the purposes of measuring and/or billing impressions and/or click-throughs.
- Two or more users can branch off into a more private shared session apart from the rest of the group.

Scenario #4 (Multi-User Online Retail Shopping Events). One exemplary embodiment can allow users to shop together during scheduled events in a shared real-time and/or near real-time session on a retailer's web site. A potential simplified process flow for this exemplary embodiment can comprise such activities as:

- A retailer advertises a scheduled online shopping event.
- At the time of the event, the user initiates the User Interface as a desktop application, component and/or widget and/or as a component embedded in a web site and/or web browser.
- The user is able to see which other users are currently active.
- The active users can be connected in a shared real-time and/or near real-time session with the other active users.
- Each user can visit pages on the retailer's site(s) that have been appropriately tagged and/or otherwise marked with content in a form that can be accessed by the User Interface.
- Each user can see which site(s) the other user(s) are currently visiting and/or which product(s) the other user(s) are currently viewing.
- A user can redirect another user or users to a specific site and/or product page on a retail web site.
- A user can add notes, ratings, reviews and/or other similar personal comments about a retailer web site and/or product. These comments can be viewed by other users.
- A user can chat with other users and can drag retailers and/or products to the chat interface to automatically send a message with the retailer name and/or logo and/or link and/or product name and/or image and/or link to other users.
- Two or more users can branch off into a more private shared session apart from the rest of the group.

A moderator and/or special guest may also be part of the group shopping online and may always be visible and/or active in the User Interface.

Scenario #5 (Multi-User Online Retail Shopping with Open Access). One exemplary embodiment can allow any users on a retail web site to shop together in a shared real-time and/or near real-time session. A potential simplified process flow for this exemplary embodiment can comprise such activities as:

- A user visits the retailer's web site.
- The user initiates the User Interface as a desktop application, component and/or widget and/or as a component embedded in a web site and/or web browser.
- The user is able to see which other users are currently active and shopping together.
- The active users can be connected in a shared real-time and/or near real-time session with the other active users.
- Each user can visit pages on the retailer's site(s) that have been appropriately tagged and/or otherwise marked with content in a form that can be accessed by the User Interface.
- Each user can see which product(s) the other user(s) are currently viewing.
- A user can redirect another user or users to a specific product page on the retail web site.
- A user can add notes, ratings, reviews and/or other similar personal comments about a product. These comments can be viewed by other users.
- A user can chat with other users and can drag products to the chat interface to automatically send a message with the product name and/or image and/or link to other users.
- Two or more users can branch off into a more private shared session apart from the rest of the group.

Figure 42:
FIG. 42 is an exemplary illustration of an exemplary user interface.

FIG. 42 is an exemplary illustration of the user interface and/or client-side instance of the software application implemented as a desktop widget connected to a web site.

Figure 43:
FIG. 43 is an exemplary illustration of an exemplary user interface.

FIG. 43 is an exemplary illustration of the user interface and/or client-side instance of the software application implemented as a desktop widget in a minimized mode showing an advertisement/promotion along with the total number of users currently shopping together.

Figure 44:
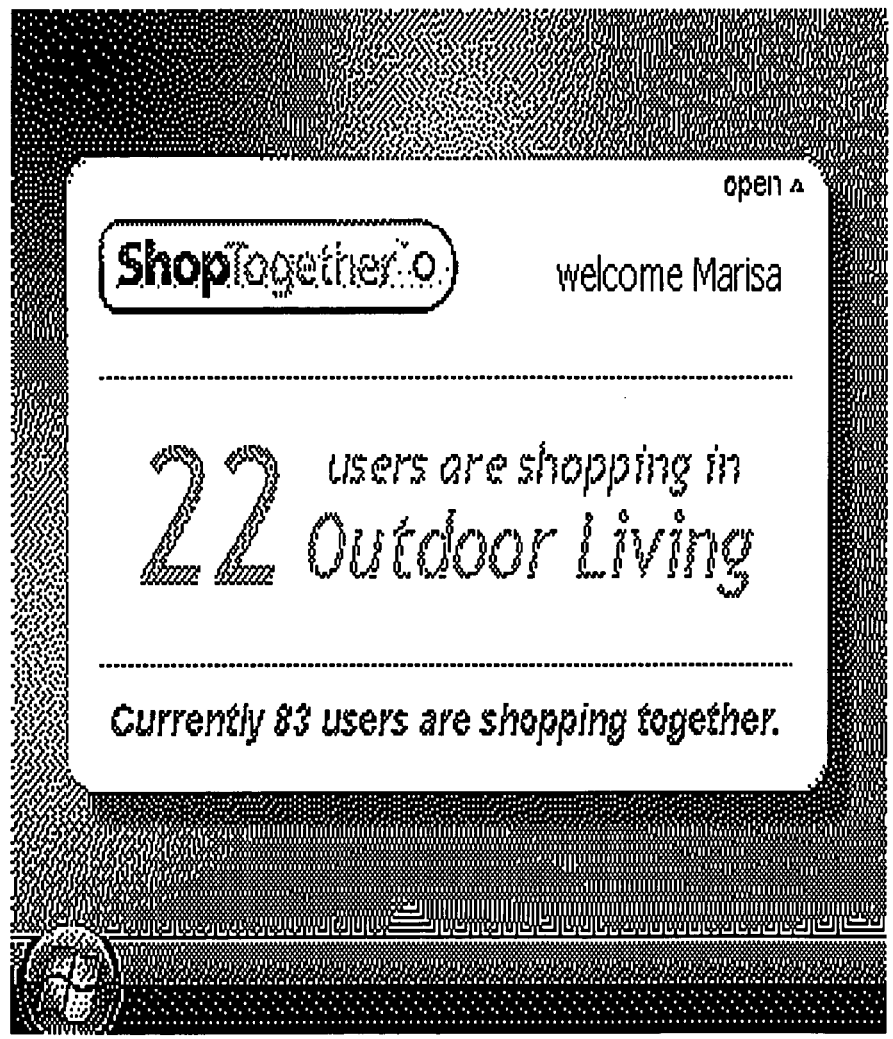
FIG. 44 is an exemplary illustration of an exemplary user interface.

FIG. 44 is an exemplary illustration of the user interface and/or client-side instance of the software application implemented as a desktop widget in a minimized mode showing the number of users shopping together in a certain product category.

Figure 45:
FIG. 45 is an exemplary illustration of an exemplary user interface.

FIG. 45 is an exemplary illustration of the user interface and/or client-side instance of the software application implemented as a desktop widget in a minimized mode showing the number of the users friends that are currently shopping together along with what one of those friends is currently viewing.

Scenario #6 (Multi-User Cross-Channel Retail Shopping Online and at Kiosk). One exemplary embodiment can allow a user at a kiosk in a retail store to shop together in a shared real-time and/or near real-time session with a friend, family member, customer service representative and/or other advisor on the retailer's web site. A potential simplified process flow for this exemplary embodiment can comprise such activities as:

- A user visits the retailer's store.
- The user initiates the User Interface on an Internet-connected electronic kiosk in the retailer's store.
- The user invites a friend, family member, customer service representative and/or other advisor to shop with them.
- The friend, family member, customer service representative and/or other advisor visits the retailer's web site and initiates the User Interface as a desktop application, component and/or widget and/or as a component embedded in a web site and/or web browser.
- The in-store and online users can be connected in a shared real-time and/or near real-time session.
- Each user can visit pages on the retailer's site(s) that have been appropriately tagged and/or otherwise marked with content in a form that can be accessed by the User Interface.
- Each user can see which product(s) the other user(s) are currently viewing.
- A user can redirect another user or users to a specific product page on the retail web site.
- A user can add notes, ratings, reviews and/or other similar personal comments about a product. These comments can be viewed by other users.
- A user can chat with other users and can drag products to the chat interface to automatically send a message with the product name and/or image and/or link to other users.

Scenario #7 (Multi-User Online Designer's Studio). One exemplary embodiment called can allow a design consultant to shop together with a one or more clients on one or more retail web sites. A potential simplified process flow for this exemplary embodiment can comprise such activities as:

- The client and the designer in different locations communicate by telephone and/or chat.
- The designer invites the client to shop together on the designer's online studio.
- The client and designer each initiate the User Interface as a desktop application, component and/or widget and/or as a component embedded in a web site and/or web browser and the consumer are connected in a shared real-time and/or near real-time session.
- The client and designer can each visit one or more web sites whose pages have been appropriately tagged and/or otherwise marked with content in a form that can be accessed by the User Interface.
- Each user can see a representation of the web site(s) and/or product(s) that the other user is viewing.
- The designer can add suggested products to a Shared Favorites list that the client can view.
- The client can look at one or more of the suggested products while the designer looks for other products that might meet the client's needs.
- The designer can see which product the client is viewing while the designer is on another page and/or web site.
- The client can look at other products on the site and the designer can see which product(s) the client is viewing while the designer is on another page on the web site.
- The designer and the client can discuss each other's product and/or shared products.
- The designer can redirect the client to a product page on a web site.
- The client and/or designer can invite another user and/or users into the shared session.

Scenario #8 (Multi-User Online Content Sharing with Open Access). One exemplary embodiment can allow any users on a content-sharing web site to share content, such as music, video, photos, books, movies, friends, personal and/or professional connections, personal profiles, blogs, articles, web sites, web pages, search engine results, data and/or other similar items and/or content, in a shared real-time and/or near real-time session. A potential simplified process flow for this exemplary embodiment can comprise such activities as:

A user visits the web site.

The user initiates the User Interface as a desktop application, component and/or widget and/or as a component embedded in the web site and/or web browser.

The user is able to see which other users are currently active and sharing content.

The active users can be connected in a shared real-time and/or near real-time session with the other active users.

Each user can visit pages on the web site that have been appropriately tagged and/or otherwise marked with content in a form that can be accessed by the User Interface.

Each user can see which content the other user(s) are currently viewing.

A user can redirect another user or users to a specific page on the web site.

A user can add notes, ratings, reviews and/or other similar personal comments about content. These comments can be viewed by other users.

A user can chat with other users and can drag content to the chat interface to automatically send a message with the content name and/or image and/or link to other users.

Two or more users can branch off into a more private shared session apart from the rest of the group.

Scenario #9 (Multi-User Online Content Sharing Among a List of Users). One exemplary embodiment can allow certain users on a content-sharing web site to share content, such as music, video, photos, books, movies, friends, personal and/or professional connections, personal profiles, blogs, articles, web sites, web pages, search engine results, data and/or other similar items and/or content, in a shared real-time and/or near real-time session. A potential simplified process flow for this exemplary embodiment can comprise such activities as:

A user visits the web site.

A user initiates the User Interface as a desktop application, component and/or widget and/or as a component embedded in the web site and/or web browser.

Having established a list of potential users to share content with, either by previous establishing relationships with other users of a web site and/or by using connections on a social networking and/or other similar site and/or by viewing currently active users on a web site and/or by inviting users to share content and/or by otherwise establishing a list of potential users to share content with, the user is able to see which users from his/her list of potential users is currently active.

The active users can be connected in a shared real-time and/or near real-time session with the other active users.

Each user can visit pages on the web site that have been appropriately tagged and/or otherwise marked with content in a form that can be accessed by the User Interface.

Each user can see which content the other user(s) are currently viewing.

A user can redirect another user or users to a specific page on the web site.

A user can add notes, ratings, reviews and/or other similar personal comments about content. These comments can be viewed by other users.

A user can chat with other users and can drag content to the chat interface to automatically send a message with the content name and/or image and/or link to other users.

Two or more users can branch off into a more private shared session apart from the rest of the group.

Scenario #10 (Multi-User Online Content Sharing with an Advisor). One exemplary embodiment called can allow a customer service representative, sales person, broker, agent, designer, and/or other advisor to share content with a consumer on a web site. A potential simplified process flow for this exemplary embodiment can comprise such activities as:

The consumer and the advisor communicate by telephone and/or chat.

The advisor invites the consumer to share content on a web site and/or web sites from different locations.

The User Interface component is initiated by both users and the advisor and the consumer connect in a shared real-time and/or near real-time session.

Each user can see a representation of the content that the other user is viewing on the web site(s).

The advisor can add suggested content to a Shared Favorites list that the consumer can view.

The consumer can look at one or more of the suggested content items while the advisor looks for other content that might meet the consumer's needs.

The advisor can see which content the consumer is viewing while the advisor is on another page on the web site(s).

The consumer can look at other products on the site and the advisor can see which product the consumer is viewing while the advisor is on another page on the web site(s).

The advisor and the consumer can discuss each other's content and/or shared content.

The advisor can redirect the consumer to a content page on the web site.

In certain exemplary embodiments, the ShopTogether server can function as any of a video conferencing server, a screen sharing server, a link sharing server, and/or a content sharing server, etc.

As a video conferencing server and/or screen sharing server, the ShopTogether server can send a picture and/or image of an actual computer screen (a screenshot) and/or a picture and/or image of a specific application's window on User A's computer to User B's computer over a communication session.

As a link sharing server, the ShopTogether server can send a URL of an actual product web page received from User A's client application to User B's client application which then can display the URL.

As a content sharing server, the ShopTogether server can receive content about the actual product displayed on a product web page from User A's client application, and then can send the content to User B's client application which then can format and display the content in order to represent the actual product. An example of the content being sent from User A to User B might be:

"ProductID='99'|ProductName='Swivel Bartool'|ProductImage='http://image.domain.com/prod_99.jpg'| ProductPrice='$209.00'|ProductURL= 'http://www.domain.com/prod_99.htm'"

Note that the content can be information about the product being displayed on the web page, not necessarily information about the web page itself. The ProductURL data in the example above need NOT even be the URL for the web page that User A visited. Instead, it can be the web page that the retailer wants User B to visit if they want more information about the product. Sometimes a product can be viewed on multiple pages on the site, but one of those pages can be the "main" product page.

In certain exemplary embodiments of the ShopTogether server, User A's client application can send an identifier for the actual product displayed on product web page to our ShopTogether server which then can lookup additional content about the product and then can send both the identifier and the additional content to User B's client application which then can format and/or display the content in order to represent the actual product. The server might receive "ProductID='99'" from User A and send "ProductID='99'|ProductName='Swivel Bartool'|ProductImage='http://image.domain.com/prod_99.jpg'|ProductPrice='$209.00'|ProductURL='http://www.domain.com/prod_99.htm'" to User B after looking up the additional content.

If User A were to send a URL to the server instead of an identifier, the server can use all and/or part of the URL as an identifier in order to lookup additional content about the product. The server then can send both the identifier and the additional content to User B's client application which then can format and/or display the content in order to represent the actual product.

Figure 46:
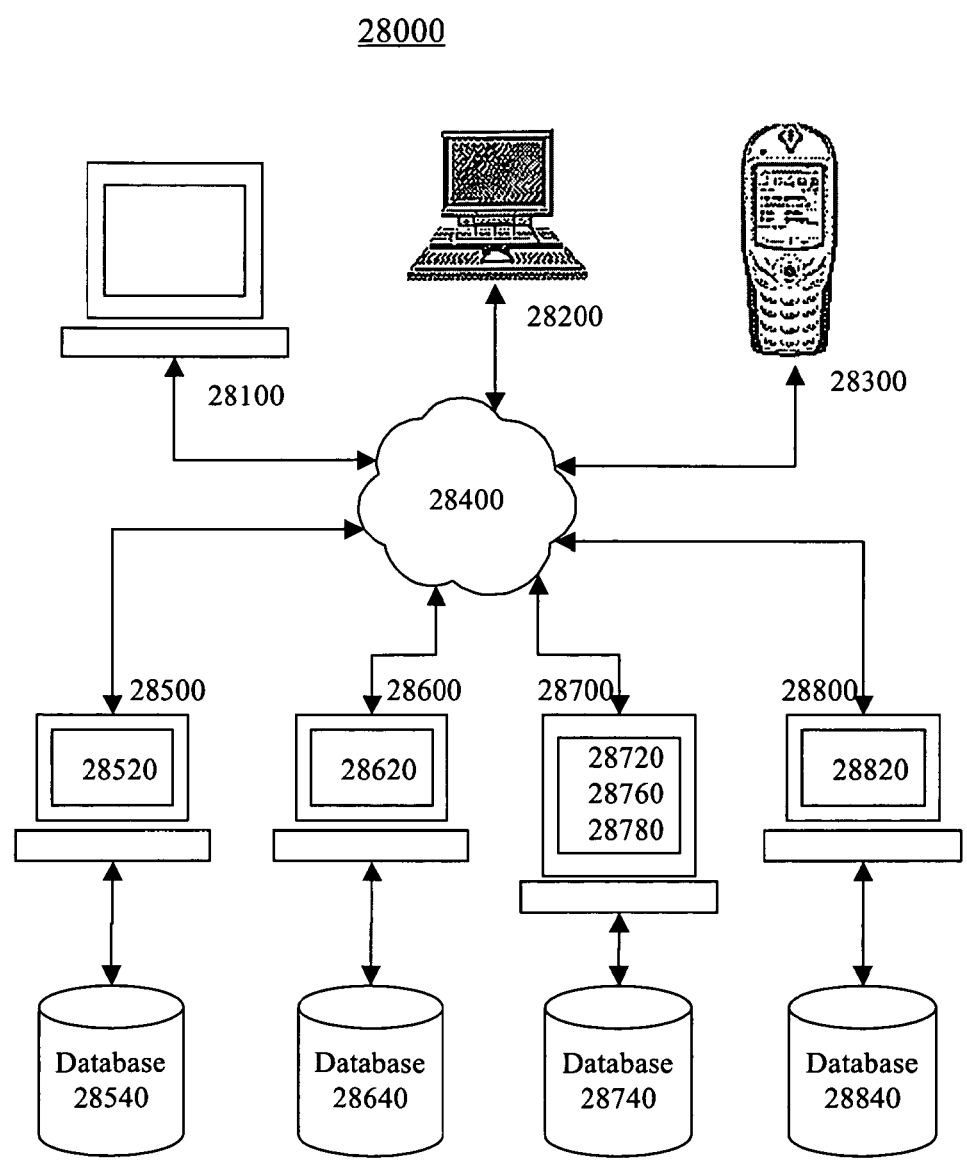
FIG. 46 is a block diagram of an exemplary embodiment of a system.

FIG. 46 is a block diagram of an exemplary embodiment of a system 28000, which can comprise any number of information devices 28100, 28200, 28300, which can be communicatively coupled via a network 28400.

Also coupled to network 28400 can be any number of servers 28500, 28600, 28700, 28800. A server can include a server software application 28520, 28620, 28720, 28820. A server can be coupled to a data storage device, repository, and/or database 28540, 28640, 28740, 28840. A server can include an administrator user interface 28760 and/or database management software 28780.

Figure 47:
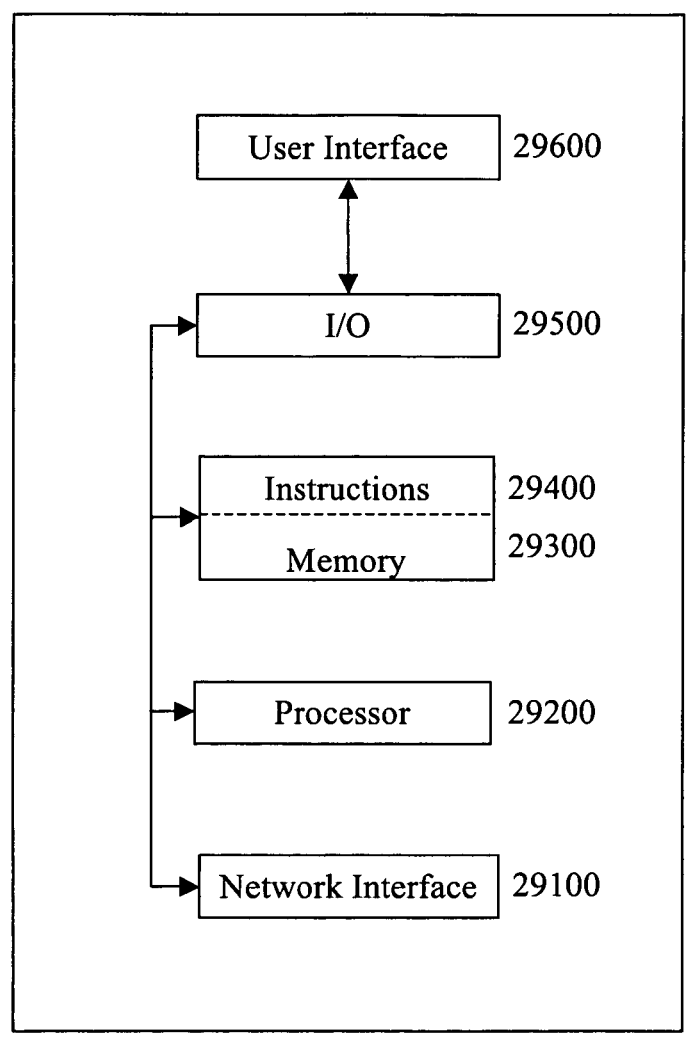
FIG. 47 is a block diagram of an exemplary embodiment of an information device.

FIG. 47 is a block diagram of an exemplary embodiment of an information device 29000, which in certain operative embodiments can comprise, for example, server 28500, 28600, 28700, 28800, and/or information device 28100, 28200, 28300, of FIG. 46. Information device 29000 can comprise any of numerous circuits and/or components, such as for example, one or more network interfaces 29100, one or more processors 29200, one or more memories 29300 containing instructions 29400, one or more input/output (I/O) devices 29500, and/or one or more user interfaces 29600 coupled to I/O device 29500, etc.

In certain exemplary embodiments, via one or more user interfaces 29600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Figure 48:
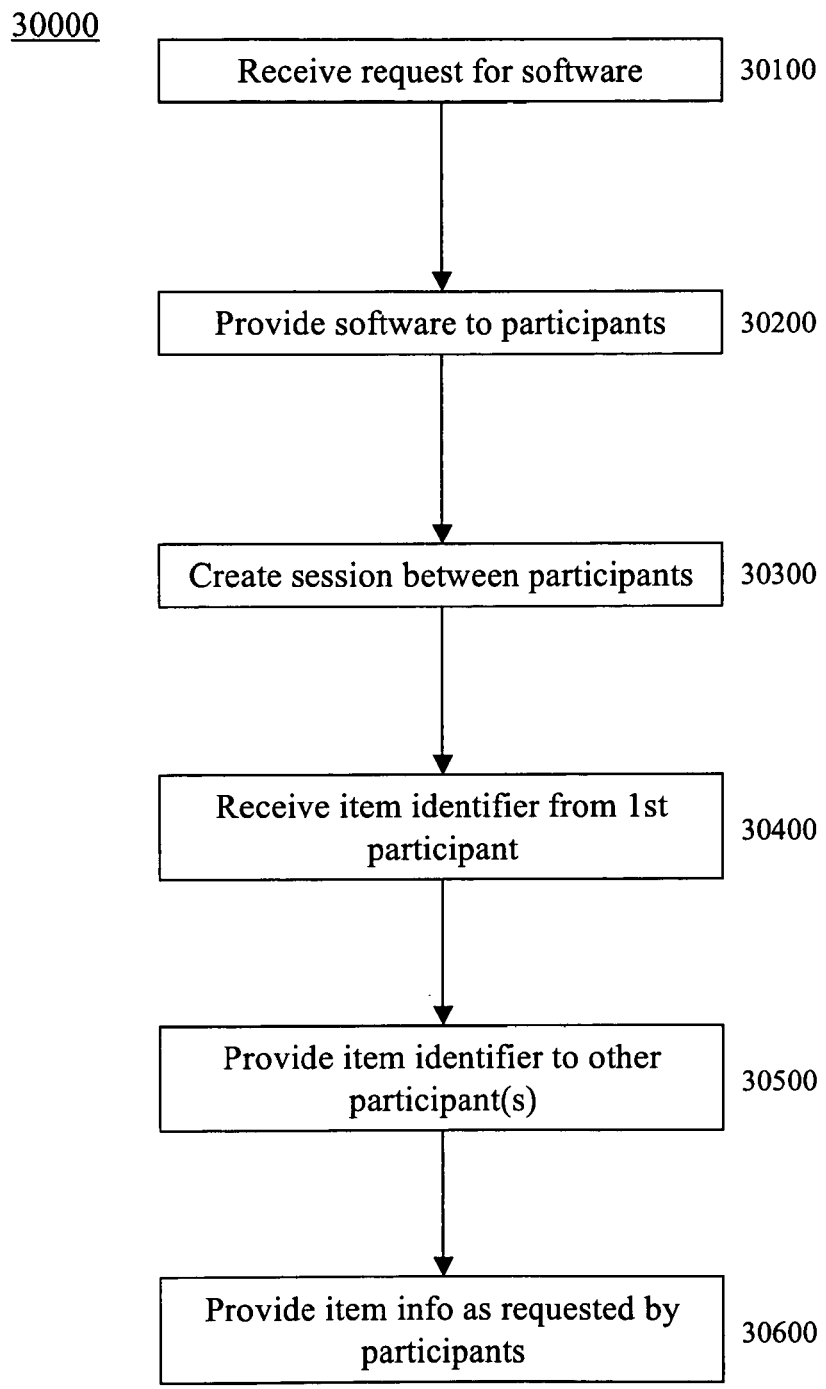
FIG. 48 is a flowchart of an exemplary embodiment of a method.

FIG. 48 is a flowchart of an exemplary embodiment of a method 30000. At activity 30100, a request can be received to provide software, such as content sharing software, to potential participants in a Shop Together session. For example, the request can be received at a server from an information device of one or more of the potential shoppers. At activity 30200, the software can be provided to one or more of the potential participants. For example, the server can provide content sharing software to an information device of one or more of the potential shoppers. At activity 30300, a communication session can be created between two or more potential participants. For example, the server can create a session between a first information device and a second information device. At activity 30400, an identifier, such as a product identifier, can be received, such as by the server, from a first potential participant, such as a first information device. At activity 30500, the received identifier can be provided, such as by the server, to one or more other potential participants, such as the second information device, in the session. At activity 30600, as requested, such as by a potential participant and/or information device, content associated with the identifier, such as information associated with a user-selected product, can be provided, such as by the server, to the requester.

Definitions

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

activity—an action, act, step, and/or process or portion thereof adapted to—made suitable or fit for a specific use or situation.

and/or—either in conjunction with or in alternative to.

apparatus—an appliance or device for a particular purpose associate—to join, connect together, and/or relate.

automatically—acting or operating in a manner essentially independent of external influence or control. For example, an automatic light switch can turn on upon "seeing" a person in its view, without the person manually operating the light switch.

backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.

Boolean logic—a complete system for logical operations.

can—is capable of, in at least some embodiments.

cause—to produce an effect.

circuit—a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network.

circuit—an electrically conductive pathway and/or a communications connection established across two or more switching devices comprised by a network and between corresponding end systems connected to, but not comprised by the network.

comprising—including but not limited to.

configure—to make suitable or fit for a specific use or situation.

containing—including but not limited to.
convert—to transform, adapt, and/or change.
create—to bring into being.
data—distinct pieces of information, usually formatted in a special or predetermined way and/or organized to express concepts, and/or represented in a form suitable for processing by an information device.
data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.
define—to establish the outline, form, or structure of
determine—to obtain, calculate, decide, deduce, and/or ascertain.
device—a machine, manufacture, and/or collection thereof
digital—non-analog and/or discrete.
estimate—to calculate and/or determine approximately and/or tentatively.
generate—to create, produce, give rise to, and/or bring into existence.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
having—including but not limited to.
human-machine interface—hardware and/or software adapted to render information to a user and/or receive information from the user; and/or a user interface.
including—including but not limited to.
information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
initialize—to prepare something for use and/or some future event.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
instructions—directions, which can be implemented as firmware and/or software, the directions adapted to perform a particular operation or function.
logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain machine-implementable instructions, data, and/or information. Examples include a memory device, punch cards, etc.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not preempting all uses of a fundamental principal.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

packet—a generic term for a bundle of data organized in a specific way for transmission, such as within and/or across a network, such as a digital packet-switching network, and comprising the data to be transmitted and certain control information, such as a destination address.

perceptible—capable of being perceived by the human senses.

physical—tangible, real, and/or actual.

physically—existing, happening, occurring, acting, and/or operating in a manner that is tangible, real, and/or actual.

plurality—the state of being plural and/or more than one.

predetermined—established in advance.

probability—a quantitative representation of a likelihood of an occurrence.

processor—a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

project—to calculate, estimate, or predict.

provide—to furnish, supply, give, and/or make available.

receive—to get as a signal, take, acquire, and/or obtain.

recommend—to suggest, praise, commend, and/or endorse.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

select—to make a choice or selection from alternatives.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

special purpose computer—a computer and/or information device comprising a processor device having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit.

special purpose processor—a processor device, having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit.

store—to place, hold, and/or retain data, typically in a memory.

substantially—to a great extent or degree.

system—a collection of mechanisms, devices, machines, articles of manufacture, processes, data, and/or instructions, the collection designed to perform one or more specific functions.

transform—to change in measurable: form, appearance, nature, and/or character.

transmit—to send as a signal, provide, furnish, and/or supply.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

weight—a value indicative of importance.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:
   from a hardware-based server, transmitting a content sharing software to two or more information devices the content sharing software being operative to cause a first information corresponding to a first user-selected item being displayed as a graphical representation on a first individual one of the two or more information devices to be transmitted from the first individual one of the two or more information devices, the content sharing software being additionally operative to cause the first individual one of the two or more information devices to display a graphical representation of a second user-selected item in response to the receipt on the first individual one of the two or more information devices of a second information corresponding to the second user-selected item, wherein the first information and the second information comprise identifiers that are not URLs or screen images;
   via the hardware-based server and the content sharing software, creating a shared real-time and/or near real-time communication session linking the two or more information devices, wherein said shared real-time and/or near real-time communication session causes, in response to the selection on the first individual one of the two or more information devices of the first user-selected item, the substantially simultaneous display of a graphical representation of the first user-selected item on the other individual ones of the two or more information devices, and wherein said shared real-time and/or near real-time communication session causes, in response to the selection on one of the other individual ones of the two or more information devices of the second user-selected item, the substantially simultaneous display of a graphical representation of the second user-selected item on the first individual one of the information devices;

at the hardware-based server, responsive to the selection of the first user-selected item or the second user-selected item, obtaining content corresponding to the first or second user-selected item; and transmitting, from the hardware-based server via said shared real-time and/or near real-time communication session, the content to the two or more information devices, the content sharing software being operative to display the content on the two or more information devices in response to receipt of the content by the two or more information devices, wherein said displaying of said content occurs substantially simultaneously with the selection of said first or second user-selected item.

2. A method comprising:

from a hardware-based server, transmitting a content sharing software to two or more information devices, the content sharing software being operative to cause a first URL corresponding to a first user-selected item being displayed as a graphical representation on a first individual one of the two or more information devices to be transmitted from the first individual one of the two or more information devices, the content sharing software being additionally operative to cause the first individual one of the two or more information devices to display a graphical representation of a second user-selected item in response to the receipt on the first individual one of the two or more information devices of a second URL corresponding to the second user-selected item;

via the hardware-based server and the content sharing software, creating a shared real-time and/or near real-time communication session linking the two or more information devices, wherein said shared real-time and/or near real-time communication session causes, in response to the selection on the first individual one of the two or more information devices of the first user-selected item, the substantially simultaneous display of a graphical representation of the first user-selected item on the other individual ones of the two or more information devices, and wherein said shared real-time and/or near real-time communication session causes, in response to the selection on one of the other individual ones of the two or more information devices of the second user-selected item, the substantially simultaneous display of a graphical representation of the second user-selected item on the first individual one of the information devices;

at the hardware-based server, responsive to the selection of the first user-selected item or the second user-selected item, obtaining content corresponding to the first or second user-selected item; and transmitting, from the hardware-based server via said shared real-time and/or near real-time communication session, the content to the two or more information devices, the content sharing software being operative to display the content on the two or more information devices in response to receipt of the content by the two or more information devices, wherein said displaying of said content occurs substantially simultaneously with the selection of said first or second user-selected item.

3. A hardware-based system comprising:

a hardware-based server configured to transmit a content sharing software to two or more information devices, the content sharing software being operative to cause a first information corresponding to a first user-selected item being displayed as a graphical representation on a first individual one of the two or more information devices to be transmitted from the first individual one of the two or more information devices, the content sharing software being additionally operative to cause the first individual one of the two or more information devices to display a graphical representation of a second user-selected item in response to the receipt on the first individual one of the two or more information devices of a second information corresponding to the second user-selected item, wherein the first information and the second information comprise identifiers that are not URLs or screen images;

wherein the hardware-based server and the content sharing software are operative to create a shared real-time and/or near real-time communication session linking the two or more information devices, wherein said shared real-time and/or near real-time communication session causes, in response to the selection on the first individual one of the two or more information devices of the first user-selected item, the substantially simultaneous display of a graphical representation of the first user-selected item on the other individual ones of the two or more information devices, and wherein said shared real-time and/or near real-time communication session causes, in response to the selection on one of the other individual ones of the two or more information devices of the second user-selected item, the substantially simultaneous display of a graphical representation of the second user-selected item on the first individual one of the information devices;

wherein the hardware-based server, responsive to the selection of the first user-selected item or the second user-selected item, is operative to obtain content corresponding to the first or second user-selected item; and wherein the hardware-based server is operative to transmit, via said shared real-time and/or near real-time communication session, the content to the two or more information devices, the content sharing software being operative to display the content on the two or more information devices in response to receipt of the content by the two or more information devices, wherein said displaying of said content occurs substantially simultaneously with the selection of said first or second user-selected item.

4. A hardware-based system comprising:

a hardware-based server configured to transmit a content sharing software to two or more information devices, the content sharing software being operative to cause a first URL corresponding to a first user-selected item being displayed as a graphical representation on a first individual one of the two or more information devices to be transmitted from the first individual one of the two or more information devices, the content sharing software being additionally operative to cause the first individual one of the two or more information devices to display a graphical representation of a second user-selected item in response to the receipt on the first individual one of the two or more information devices of a second URL corresponding to the second user-selected item;

wherein the hardware-based server and the content sharing software are operative to create a shared real-time and/or near real-time communication session linking the two or more information devices, wherein said shared real-time and/or near real-time communication session causes, in response to the selection on the first individual one of the two or more information devices of the first user-selected item, the substantially simultaneous display of a graphical representation of the first user-selected item on the other individual ones of the two or more information devices, and wherein said shared real-time and/or near real-time communication session causes, in response to the selection on one of the other individual ones of the two or more information devices of the second user-selected item, the substantially simultaneous display of a graphical representation of the second user-selected item on the first individual one of the information devices;

wherein the hardware-based server, responsive to the selection of the first user-selected item or the second user-selected item, is operative to obtain content corresponding to the first or second user-selected item; and wherein the hardware-based server is operative to transmit, via said shared real-time and/or near real-time communication session, the content to the two or more information devices, the content sharing software being operative to display the content on the two or more information devices in response to receipt of the content by the two or more information devices, wherein said displaying of said content occurs substantially simultaneously with the selection of said first or second user-selected item.

* * * * *